US012366087B2

(12) United States Patent
Wickramasekera

(10) Patent No.: US 12,366,087 B2
(45) Date of Patent: *Jul. 22, 2025

(54) HYBRID COLLAPSIBLE SHELTER

(71) Applicant: Outlier Campers LLC, Cambridge, MA (US)

(72) Inventor: Ananda Wickramasekera, Cambridge, MA (US)

(73) Assignee: Outlier Campers LLC, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,371

(22) Filed: Jul. 23, 2024

(65) Prior Publication Data

US 2024/0376741 A1 Nov. 14, 2024

Related U.S. Application Data

(63) Continuation of application No. 17/950,762, filed on Sep. 22, 2022, now Pat. No. 12,077,978.

(Continued)

(51) Int. Cl.
*E04H 15/18* (2006.01)
*B60P 3/34* (2006.01)
(Continued)

(52) U.S. Cl.
CPC ............... *E04H 15/48* (2013.01); *B60P 3/34* (2013.01); *B60P 3/341* (2013.01); *B60P 3/38* (2013.01); *B60P 3/39* (2013.01); *E04B 1/344* (2013.01); *E04H 15/008* (2013.01); *E04H 15/324* (2013.01); *E04H 15/54* (2013.01)

(58) Field of Classification Search
CPC ..... E04H 15/48; E04H 15/008; E04H 15/324; E04H 15/54; E04H 15/06; E04H 15/30; E04H 15/56; B60P 3/34; B60P 3/341; B60P 3/39; B60P 3/38; E04B 1/34315;
(Continued)

(56) References Cited

U.S. PATENT DOCUMENTS 1,715,971 A * 6/1929 Wilson .................... B60P 3/341
296/173
2,804,083 A * 8/1957 Wieber ................. E04B 1/3441
135/904

(Continued)

FOREIGN PATENT DOCUMENTS

GB      2040834         9/1980
GB      2040834 A   *   9/1980    ............... B60P 3/38
WO  WO-2024242709 A1 * 11/2024   ............... B60P 3/34

*Primary Examiner* — Robert Canfield
(74) *Attorney, Agent, or Firm* — Fox Rothschild LLP

(57) ABSTRACT

Provided is a hybrid shelter comprising multiple rigid panels or panel sections comprising a floor section, a roof section, two side-wall sections, and two end-wall sections; a water-resistant soft-shell; and a case. The shelter is transitionable between an expanded configuration in which the side-wall sections and the end-wall sections are vertical and perpendicular to the floor section and a collapsed configuration in which the rigid panels and the soft-shell are folded or hinged and fully enclosed in the case. The soft-shell covers one or both sides of the roof section, the side-wall sections and the end-wall sections of the rigid panels in the expanded configuration.

20 Claims, 29 Drawing Sheets

Related U.S. Application Data

(60) Provisional application No. 63/316,152, filed on Mar. 3, 2022.

(51) Int. Cl.
  *B60P 3/38* (2006.01)
  *B60P 3/39* (2006.01)
  *E04B 1/344* (2006.01)
  *E04H 15/00* (2006.01)
  *E04H 15/32* (2006.01)
  *E04H 15/48* (2006.01)
  *E04H 15/54* (2006.01)

(58) Field of Classification Search
  CPC .. E04B 1/34317; E04B 1/34321; E04B 1/344; E04B 1/3445; E04B 1/3448; E04B 1/3449
  USPC ......... 135/88–14, 88.18, 143, 148–150, 901; 296/159, 160, 164; 52/70, 71, 79.5, 52/DIG. 14
  See application file for complete search history.

(56) References Cited

U.S. PATENT DOCUMENTS

| | | | | |
|---|---|---|---|---|
| 2,857,924 | A * | 10/1958 | Gibbons | B60P 3/38 135/117 |
| 3,078,117 | A * | 2/1963 | Martini | B60P 3/34 296/26.02 |
| 3,575,460 | A * | 4/1971 | Kennedy | B60P 3/38 5/8 |
| 3,703,181 | A * | 11/1972 | Tholen | E04H 15/06 135/904 |
| 3,739,536 | A | 6/1973 | Ward | |
| 4,101,062 | A * | 7/1978 | Lazar | B60R 9/055 224/314 |
| 4,239,247 | A * | 12/1980 | Hinz | E04H 15/001 D25/1 |
| 4,366,979 | A * | 1/1983 | Pillot | B60P 3/38 296/160 |
| 5,033,493 | A | 7/1991 | Senchuck | |
| 5,271,423 | A * | 12/1993 | Eychaner | E04H 15/56 135/901 |
| 5,341,588 | A | 8/1994 | Lizotte | |
| 5,493,818 | A * | 2/1996 | Wilson | E04B 1/3445 52/79.5 |
| 5,749,387 | A * | 5/1998 | Thompson | E04H 15/001 135/901 |
| 5,752,470 | A | 5/1998 | Koneke | |
| 6,631,590 | B1 | 10/2003 | Glowaski | |
| 7,882,849 | B2 * | 2/2011 | Franta | E04H 15/001 135/901 |
| 10,612,265 | B1 * | 4/2020 | Walter | E04H 15/001 |
| 11,711,047 | B2 | 7/2023 | Wickramasekera | |
| 11,840,857 | B1 | 12/2023 | Gauthier et al. | |
| 2004/0065361 | A1 * | 4/2004 | Pratt | E04H 15/324 135/148 |
| 2012/0037196 | A1 * | 2/2012 | McDaniel, Jr. | E04H 15/008 135/96 |
| 2014/0047781 | A1 * | 2/2014 | Miller | A01M 31/025 52/79.5 |
| 2015/0308135 | A1 * | 10/2015 | Athanasiou | E04H 1/12 52/79.5 |
| 2024/0376742 | A1 * | 11/2024 | Wickramasekera | B60P 3/341 |

* cited by examiner

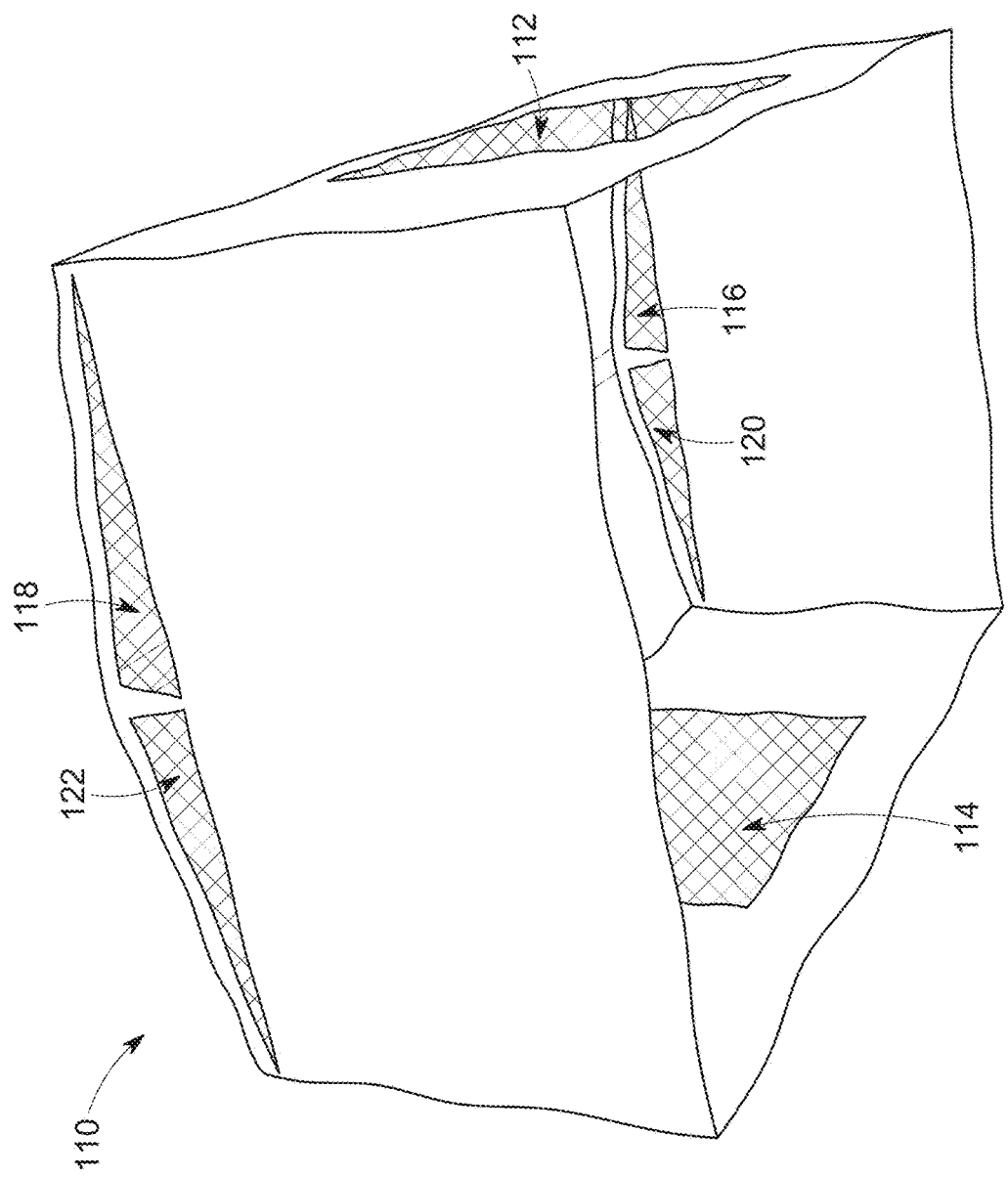

HYBRID COLLAPSIBLE SHELTER

CROSS REFERENCE TO RELATED APPLICATIONS

This application is a continuation of U.S. patent application Ser. No. 17/950,762, filed on Sep. 22, 2022, which claims the benefit of priority to U.S. Provisional Patent Application No. 63/316,152, filed on Mar. 3, 2022. The entire contents of these patent applications are herein incorporated by reference.

TECHNICAL FIELD

Embodiments of the present disclosure relate to a hybrid collapsible shelter and a method thereof, and more particularly, to a hybrid collapsible shelter comprising multiple rigid panels or panel sections, a water-resistant soft-shell, and a case.

BACKGROUND

Current soft-shell rooftop tents (i.e., rooftop tents that typically have fabric roofs and walls) on the market provide some protection from weather, insects, and smaller animals, but offer limited protection from severe weather and larger animals or intruders. In most cases, the heavier the fabric the more insulation and protection it may provide from weather, however it may be more cumbersome to pack. The soft tent sides also may not be suitable for a person to sit up and lean against it. The tent sides may also not be able to accommodate devices attached to them. The main advantage of many soft-shell rooftop tents is that they pack down and fold into a smaller case and have a smaller footprint, as compared with hard-shell rooftop tents. Often the only rigid section is the floor, which can be folded in half or folded into smaller sections for storage. The mattress can also often be folded in half or into smaller sections for storage. When collapsed for storage and transportation, many soft-shell tents do not take up the entire space above a vehicle's roof, or in the case with pickup trucks, may fit in or above the pickup truck bed, without extending past it (for example, pickup trucks with typical bed sizes less than 7 feet in length may contain a soft-shell tent with a small footprint mounted to a rack just above the bed portion of the truck). This allows the tent to be stored below the cab roof line of the pickup truck for better aerodynamics leading to better handling and improved fuel efficiency. When opened or erected for use, the soft-shell tent's footprint may double or otherwise increase in size, and may cantilever over a side of the vehicle, or take up more of the roof or rack space.

As compared with soft-shell tents, hard-shell rooftop tents (i.e., rooftop tents with a hard roof and floor, but fabric side walls) may provide better protection from weather because they are sturdier and often pack down easier, by simply lowering the roof toward the floor, tucking the fabric sidewalls in, and latching the roof section to the floor section. However, hard-shell rooftop tents have a closed case that takes up a larger footprint when collapsed or stored, because the roof section and floor section are often slightly wider and longer than the mattress they contain, and often not foldable. In many cases, these tents take up the entire space or a majority of the space above a vehicle's roof and often even extend beyond the roof. Or, if installed above a pickup truck bed, they're often longer than the bed, and therefore have to be either installed high enough to extend over the cab of the pickup truck, which may lead to decreased fuel efficiency and worse handling, or they may have to extend a significant distance past the end of the bed, resulting in an increased total length of the vehicle combined with the camper, or some may consider the appearance of the camper extending far beyond the rear of the truck as less desirable. This is true for most compact, mid-sized, or full-sized pickup trucks with beds shorter than 7 feet. As with soft-shelled tents, hard-shelled tents also have soft tent sides that may not be suitable to lean against and/or attach fixtures or devices to them.

Fully hard-sided campers, including hard-sided rooftop campers (i.e., campers that have rigid walls, roof, and floor with no tent material) provide more comfort, convenience, and better protection from weather, insects, animals, and/or intruders, as compared with hard-shell rooftop tents (i.e., hard top and bottom with soft sides) and soft-shell rooftop tents (i.e., soft roof and sides with a hard bottom). When hard-sided rooftop campers are expanded or erected for use, they may have sturdy walls that can be leaned against, and may accommodate lights, ventilation fans, television screens, other electronics, and/or other fixtures. Compared to tents, they may provide a more comfortable, insulated enclosure that may be more easily climate controlled. As with hard-shell rooftop tents, however, they may take up a larger footprint when collapsed or stored (for example, they may take up the entire vehicle rack or even extend beyond it). Because hard-sided rooftop campers have rigid panels that need to be either folded and/or separated for storage, they also have joints that need additional sealing (i.e., with gaskets and/or seals made of rubber and/or other material) between each panel and panel section, as compared with both hard-shell and soft-shell rooftop tents. Hard- and soft-shelled tents employ water and insect proof tent fabric that is either permanently attached (i.e., glued) or is attachable (i.e., by use of hook and loop fasteners, zippers, snaps, or by some other means that allows for easy attachment or detachment, if necessary) to the floor section and/or roof section. This fabric may prevent water, small animals, and insects from entering the erect tents. Hard-shell rooftop tents may still use a gasket or seal between the top lid and the bottom lid of the closed case, but once erect, the connected fabric walls may prevent water or insect intrusion. Soft-shell tents may be further folded to reduce their closed footprint, but to attempt to fold a hard-shell tent or hard-sided camper to further reduce its footprint would introduce more complexity and folds, particularly in areas that are difficult to seal, such as the roof. In addition, the rigid panels of hard-sided campers may need to serve many functions, such as protect the interior from water, insects, and small animals; may need to provide insulation; may need to be lightweight, if the camper is to be placed on a vehicle roof; and may have to be structural. This significantly reduces the types of material that may be used for hard-sided camper walls.

The benefits of employing a soft, water- and inset-proof (or resistant) fabric liner over rigid panels are numerous: the rigid internal panels may contain as many joints as may be necessary to allow for more compact folding for storage without the need for sealing; the rigid internal panels may contain joints for a door and windows and between the panel and top and bottom lids of the case that do not require sealing; the rigid internal panels may contain holes or attachment points for fixtures such as lighting or fans without the need for sealing; the rigid internal panels may be made of any suitable material (e.g., light-weight panels), without the need for them to be waterproof or water resistant (e.g., solid panels, perforated panels, wire frame or mesh panels, etc.); the rigid internal panels may also be entirely clear or have clear portions (e.g., clear polycarbonate panels) that may serve as windows together with an openable portion of the tent (e.g., zippered window and screens); the rigid internal panels may further be wrapped with and/or attached to fabric material (e.g., a fabric sleeve with foam or other insulating material may enclose (i.e., wrap or surround all sides) a rigid panel or panel section, or fabric may cover or be attached to one or both sides of a rigid panel or panel section) for better insulation and to achieve upholstered interior walls; the choice of hinges to connect panels and/or panel sections is greater since some may create gaps that would otherwise be difficult to seal, such as 2-way hinges; the waterproof tent material may be made of any suitable material as long as it is waterproof or water resistant (e.g., a lighter, thinner material may be used as compared with heavier canvas or insulating material used in typical rooftop tents); the tent may be reversible, with one side being shiny or white to reflect heat in warmer weather, and one side being dark or black to absorb heat in colder weather, or may be two other colors or patterns on each side; and if desired, a wet liner may be removed to dry or be stored separately prior to closing the case for transport.

It would be beneficial for a shelter or camper to provide all of the benefits of a hard-sided camper with the compact footprint of a soft-shelled tent. Hybrid shelters or campers that have attributes of hard-sided campers but can fold down into a small enough footprint that they may occupy less space on a vehicle roof or may fit in or over a pickup truck bed less than 7 feet in length, and do not require complicated or numerous seals are described herein. A method of easily covering or constructing rigid panels with upholstery to achieve greater insulation, increased functionality, better appearance, more comfort, and/or less complicated and costly assembly and manufacturing is also described herein. And a method for storing a bed in multiple sections in a rigid or semi-rigid case, or in a case with rigid components, then repositioning the bed sections to form a larger, more comfortable bed for use is described herein.

SUMMARY

An exemplary embodiment of the present disclosure has been made in an effort to provide a hybrid shelter comprising multiple rigid panels or panel sections comprising a floor section, a roof section, two side-wall sections, and two end-wall sections; a water-resistant soft-shell; and a case. The shelter is transitionable between an expanded configuration in which the side-wall sections and the end-wall sections are vertical and perpendicular to the floor section and a collapsed configuration in which the rigid panels and the soft-shell are folded or hinged and fully enclosed in the case. The soft-shell encloses (i.e., wraps or surrounds all sides) the roof section, the side-wall sections and the end-wall sections of the rigid panels in the expanded configuration. In some other embodiments, the soft-shell may cover or be attached to one or both sides of the rigid panels or sections.

In an exemplary embodiment, the rigid panels comprise composite material, metal, plastic, wood or a combination thereof.

In an exemplary embodiment, the soft-shell comprises canvas, fabric, plastic, nylon, vinyl, or a combination thereof.

In an exemplary embodiment, the rigid panels include a door and/or a window that aligns with a door and/or a window of the soft-shell.

In an exemplary embodiment, the shelter further comprises a bed system that includes a mattress platform and/or a mattress.

In an exemplary embodiment, the mattress platform includes a hatch.

In an exemplary embodiment, the rigid panels comprise structural panels covered by sleeves.

In an exemplary embodiment, the floor section, the roof section, the two side-wall sections, and the two end-wall sections are bi-fold or hinged on one side, respectively.

In an exemplary embodiment, the case comprises a top section and a bottom section.

In an exemplary embodiment, the soft-shell comprises an elastic seam and an attachment that are configured to secure the soft-shell to the case.

In an exemplary embodiment, the side-wall sections and the end-wall sections are vertical and perpendicular to the roof section in the expanded configuration.

In an exemplary embodiment, the roof section forms a pitched roof (e.g., the first and the second roof sections are slanted relative to the side-wall sections in order to form an "A" shaped pitched roof to prevent water from collecting and provide additional interior height). In some embodiments, the angle relative to the side-wall sections is greater than 90 degrees. It may also be necessary to have a middle section of the roof to join the gap between the roof sections (e.g., hinged to the roof sections or as a separate, loose piece placed in between the roof halves). Also, it may be necessary for additional quarter panels (e.g., either hinged to the roof or hinged to the end-wall sections) to fill the gap between the end-wall sections and the pitched roof.

An exemplary embodiment of the present disclosure provides a hybrid shelter comprising a first rigid panel comprising a first roof section, a first side-wall section and two first end-wall sections; a second rigid panel comprising a second roof section, a second side-wall section and two second end-wall sections; a water-resistant soft-shell; and a case comprising a top section containing the first rigid panel and a bottom section containing the second rigid panel. The first and the second roof sections jointly make a roof portion of the shelter; the first side-wall section makes a first side wall portion of the shelter; the second side-wall section makes a second side-wall portion of the shelter; each of the first end-wall sections and each of the second end-wall sections make an end-wall portion of the shelter; and a floor of the case makes a floor portion of the shelter. The shelter is transitionable between an expanded configuration in which the side-wall portions and the end-wall portions are vertical and perpendicular to the floor portion and a collapsed configuration in which the rigid panels and the soft-shell are folded or hinged and fully enclosed in the case. The soft-shell encloses (i.e., surrounds all sides) the roof portion, the side-wall sections and the end-wall sections of the rigid panels in the expanded configuration. In some other embodiments, the soft-shell may cover or be attached to one or both sides of the rigid panels or sections.

In an exemplary embodiment, the rigid panels comprise composite material, metal, plastic, wood or a combination thereof.

In an exemplary embodiment, the soft-shell comprises canvas, fabric, plastic, nylon, vinyl, or a combination thereof.

In an exemplary embodiment, the rigid panels include a door and/or a window that aligns with a door and/or a window of the soft-shells.

In an exemplary embodiment, the shelter further comprises a bed system that includes a mattress platform and/or a mattress.

In an exemplary embodiment, the mattress platform includes a hatch.

In an exemplary embodiment, the rigid panels comprise structural panels covered by sleeves.

In an exemplary embodiment, the first roof section, the first side-wall section and the first end-wall sections are hingedly connected.

In an exemplary embodiment, the second roof section, the second side-wall section and the second end-wall sections are hingedly connected.

In an exemplary embodiment, the soft-shell comprises an elastic seam and an attachment that are configured to secure the soft-shell to the case.

In an exemplary embodiment, the side-wall sections and the end-wall sections are vertical and perpendicular to the roof section in the expanded configuration.

In an exemplary embodiment, the roof portion forms a pitched roof (e.g., the first and the second roof sections are slanted relative to the side-wall sections in order to form an "A" shaped pitched roof to prevent water from collecting and provide additional interior height). In this configuration, the angle relative to the side-wall sections is greater than 90 degrees. It may also be necessary to have a middle section of the roof to join the gap between the roof sections (e.g., hinged to the roof sections or as a separate, loose piece placed in between the roof halves). Also, it may be necessary for additional quarter panels (e.g., either hinged to the roof or hinged to the end-wall sections) to fill the gap between the end-wall sections and the pitched roof.

Alternatively, a hybrid shelter is provided, comprising multiple rigid panels or panel sections comprising a floor section, a roof section, two side-wall sections, and one end-wall section. The hybrid shelter further comprises a water-resistant soft-shell; and a case to which a part of the roof section is hinged. The shelter is transitionable between an expanded configuration in which the side-wall sections are vertical and perpendicular to the floor section and a collapsed configuration in which the rigid panels and the soft-shell are folded or hinged and fully enclosed in the case. The soft-shell encloses (i.e., surrounds all sides) the roof section, the side-wall sections and the end-wall section of the rigid panels in the expanded configuration. The end-wall section may be slanted to the roof and floor sections, and the roof section may be slanted to the floor section. The resulting hybrid shelter may be wedge-shaped.

In an exemplary embodiment, the case comprises lids, and a part of the roof section is hinged to a part of the lids.

In an exemplary embodiment, the rigid panels comprise composite material, metal, plastic, wood or a combination thereof.

In an exemplary embodiment, the soft-shell comprises canvas, fabric, plastic, nylon, vinyl, or a combination thereof.

In an exemplary embodiment, the rigid panels include a door and/or a window that aligns with a door and/or a window of the soft-shells.

In an exemplary embodiment, the shelter further comprises a bed system that includes a mattress platform and/or a mattress.

In an exemplary embodiment, the mattress platform includes a hatch.

In an exemplary embodiment, the rigid panels comprise structural panels covered by sleeves.

In an exemplary embodiment, the roof section, the side-wall sections, the end-wall section are hingedly connected.

In an exemplary embodiment, the soft-shell comprises an elastic seam and an attachment that are configured to secure the soft-shell to the case.

Embodiments of the present disclosure are related to a hybrid shelter that employs a plurality of rigid panels and/or panel sections, including in the floor and roof, that also contains an outer, fabric, water-proof or resistant, and insect-proof or resistant tent cover, and collapses into a case is described herein. A method of upholstering the rigid panels of the exemplary shelter for increased comfort, improved function, and reduced cost and complexity in manufacturing and assembly is also described herein. And an exemplary bed system that may be separated into sections for easier storage in a case and then repositioned for use is described herein.

All of the components of a hybrid shelter may be contained in a hard-sided case, with similarly sized top and bottom sections or lids. Similar to hard-sided luggage, the case may be divided two similarly sized halves, with each containing portions of the hard-sided panel frame, tent liner or cover, mattress, and other components that may be stored inside the case, such as batteries, fans, lights, a ladder, or any other component or fixture. The case may be mounted to a vehicle roof rack, pickup truck bed rack, trailer, or any other suitable platform. It may also simply be transported or stored inside a vehicle without attachment (e.g., inside the cargo area of an SUV, van, trailer, container, or in a pickup truck bed). The case may, with the components stored inside, be a self-contained camper that is temporarily, semi-permanently, or permanently placed on any suitable surface for storage and/or use. The hard-sided case may have any exterior shape or contain any features necessary for better aerodynamics, for example, when transported atop a vehicle roof rack (e.g., wind fairing, diffuser, ribs, spoiler, wing, etc.). The interior of the case may be large enough to store components of the hybrid shelter. The case may be comprised of a hard material like plastic, fiber reinforced plastic, carbon fiber, aluminum, or other rigid material. Alternatively, the case may be comprised of a soft material with a rigid internal frame (e.g., an aluminum frame inside a soft, vinyl cover). The case may be sealed (e.g., with a rubber seal or other material suitable for sealing) and latched tightly closed for storage and transportation. The case may be folded in half, lengthwise, giving it a narrower footprint (e.g., 2 to 4 feet wide, or narrower or wider, by about 6 to 9 feet long, or shorter or longer), or it may be folded in half, widthwise, giving it a shorter footprint (e.g., 2 to 6 feet wide, or narrower or wider, by about 3 to 5 feet long, or shorter or longer). When opened, the case may be large enough to contain an unfolded mattress or adjoined mattress sections (e.g., if the mattress is in more than one piece), or larger. While opening, components stored in the top and bottom sections may be constrained, so as not to fall out, by the tent cover that spans both sections and additionally by straps, similar to how zippered fabric and/or straps keep contents in place while opening hard-sided luggage. When opened, the top and bottom sections of the case may form the floor and/or foundation to which the internal rigid panel frame may be erected upon.

The fabric tent liner or cover may be made of any suitable material that is waterproof or water resistant, similar to material used in some tents. The tent material may be reversible so that one side is shiny or white, to reflect heat in warmer weather, while the other side is darker or black, to absorb heat in colder weather. Or the tent may be of one or more other colors or patterns on one or both sides. The tent may also be clear or see-through. The tent may contain doors and windows with or without screens, ventilation ports, electrical ports, or other openings that may be easily opened and closed by zipper, hook-and-loop fastener, snaps, magnets, or by some other means typically used in tents. The tent liner or cover may be attached to both the top and bottom lids by hook and loop fasteners, snaps, zippers, magnets, glue, screws, and/or any other attachment mechanism typically used to temporarily, semi-permanently, or permanently attach fabric to a rigid material. The tent cover may be attached to the top and bottom sections of the case at a point slightly higher than the bottom of the fabric, such that a portion of the tent overlaps the joint between it and the floor formed by the case, covering that joint from water (e.g., rainwater from above) and, optionally, the bottom of the fabric may contain an elastic seam (e.g., a highly elastic seam). When the case is opened for use (e.g., the case is opened and laid flat), the bottom portion of the tent cover, below the attachment point, may be pulled over both the top and bottom lids of the case, and the elastic seam may tightly wrap around the top and bottom lids. This may ensure water (e.g., rainwater) does not get into the top and bottom lids of the case, which may form the floor of the shelter. Above the attachment point, all contents under the tent, whether erect or not, will be protected from insects as well. The upper portion of the tent will remain loose above the folded, internal, rigid panels and other contents. When the case is in an open, flat position, and by locating and opening a tent door (e.g., a zippered door or door attached with hook and loop fasteners in the tent, similar to many tent doors), a person may gain access to the internal rigid panels and other components stored inside the case.

The rigid, internal panels under the tent may be in as many sections as may be necessary to allow for folding and fitting into the case. With the case in open position and after accessing the rigid panels through the door in the un-erected tent, a person may begin to move the rigid panels into position, which will form the frame for the tent. A portion of the rigid panels may be hingedly connected to either the top or bottom sections of the case and/or to adjoining panel sections. The panels sections may also be latched to the top and bottom sections of the case or to nearby panel sections along portions that are not hinged, and where necessary for sturdiness. By unfolding the panels and moving them into position along their hinges and attaching with latches or other mechanisms along non-hinged joints, if necessary, the rigid internal panels may form four (4) walls (e.g., 3 to 6 walls) and a roof, creating a rigid enclosure beneath the tent, suitable in height for siting, standing, and/or sleeping. The rigid panels may be made of a solid, porous, perforated, or mesh material. The material may be strong enough to support the tent above, support occupants leaning or resting against them, prevent intrusion by large animals or persons, and provide shelter from extreme weather. When the rigid panels are fully unfolded and erected, latched and/or locked, they may form a secure enclosure that, along with the tent liner or cover, may be further protected from weather, smaller animals, or insects. The rigid panels may contain doors and windows that may be hingedly connected and/or latched. The doors and windows may be locked to prevent unwanted opening from outside. The panels and panel sections, along with any doors or windows sections, may be enclosed in a sleeve or sleeves that provides insulation, comfort, and many other benefits. The sleeves may contain insulating foam that also serves as padding over the rigid walls. The sleeves may also add upholstering to the walls for a more comfortable and pleasing interior. The panels may contain lights, fans, electrical outlets, or other fixtures permanently, semi-permanently, or temporarily attached to them. If sleeves are used, they may contain flaps, ports, or may be pulled back to allow access to accessories or accessory attachment points, doors, windows, and/or other openings. Sleeves over the rigid panels may also increase the options for rigid panel material used to construct the panels, since the panels will be covered. The sleeves may also allow for simpler assembly and manufacturing, by reducing or eliminating the need for fasteners for glue. The sleeves may also easily be removed or reversed. Alternative to sleeves, fabric material that serves the same purpose may simply be attached to one side or both sides of the rigid, internal panels. For doors, windows, ventilation ports, electrical ports, or other openings that require access from the interior to the exterior, the openings in the internal rigid panels and/or fabric may be aligned with openings (with or without insect screens) in the tent. The sleeves or internal fabric sections may also serve as shades. By pulling up, pulling down, pulling back, or removing that portion of the fabric sleeve, and if that portion of the rigid panel is see-through, and if it is also aligned with a see-through portion of the tent, a person may be able to gain a view of the outside.

Like the rigid panels and tent, the mattress and mattress panel, if used, may be contained in the closed case. The mattress may be accessible once the case is opened, the panels are positioned for use, and the tent is erect. The mattress may be a memory foam or other type of mattress, similar to those currently used in rooftop tents. The mattress may be in two (2) halves, or more sections, contained in the top and/or bottom sections of the case. Or the mattress may in one continuous, foldable section. As is often the case with rigid cases, like hard-sided suitcases, a stiff, raised joint is present between the top and bottom sections of the case, when opened. With this joint in the middle of the enclosure, once the walls and roof are erect, a mattress, if in 2 sections, may be used as two separate beds with the top and bottom sections of the case serving as the floor under the mattress. If the mattress is in 2 sections and has a rigid mattress platform, also in two sections, or if the mattress is foldable and in 1 piece with a foldable mattress platform, or if the mattress is in multiple sections and the mattress platform is also in multiple sections or has multiple folds, the mattress platform and mattress sections may be repositioned on top of or over the stiff, raised joint between the top and bottom lids and may be further supported on the sides by resting on wall panel corner hinges (e.g., similar to hinges on folding tables) and/or other support along the side wall panels and/or top and bottom lids, to allow for a "floating" bed over the middle lid joint. Bedding and other items may be left on the mattress when stored or in use. The mattress platform may also contain a hatch or hatches to access any storage under the mattress, without the need for lifting the whole mattress platform, or the mattress platform may contain handles to allow for easy lifting or moving of the mattress and platform to access the storage area beneath, and to position the mattress and platform for use or storage.

Other fixtures such as a fan, or other heating and cooling equipment; entertainment devices such as a television, tablet, or projector and projector screen; lighting and other electrical equipment; or other devices and accessories may be attached to the wall panels, roof panels, or floor sections of an erect camper or shelter. Power for electrical devices may be from an internal battery stored inside the enclosure, or from an external power source. The top lid of the case may also have solar panels attached to its exterior, top surface, that may be used while the solar panels remain facing the sun.

To close and pack up the hybrid camper: the mattress and mattress platform sections may be positioned for storage; the detachable accessories and devices may be detached, unplugged, or otherwise disconnected, if necessary, and positioned for storage; the rigid, internal wall panels may be unlatched, folded and further positioned for storage; and with that, the tent will come down. The portion of the tent that is below where it attaches to the top and bottom sections of the case may be stretched and pulled from beneath the top and bottom lids, and as the elastic comes back together above the top and bottom sections of the case, while the case lays open, the bottom section of the tent fabric, with its elastic seam, may further constrain the loose tent within the perimeter of the open case. Straps attached to the elastic tent bottom seam, if present, may be latched together to further constrain the tent and all other components beneath it to prevent them from falling out as the case is closed, similar to straps in many hard-sided suitcases. The top lid may then be folded over so that it joins the bottom section and may be latched and/or locked together to form a weatherproof case.

BRIEF DESCRIPTION OF DRAWINGS

The disclosed devices, components, assemblies, systems and methods can be better understood with reference to the description taken in conjunction with the following drawings, in which like referenced numerals identify the elements. The components in the drawings are not necessarily to scale.

FIG. 29 shows an exemplary tent that may cover the rigid panels of FIG. 27.

Figure 1:
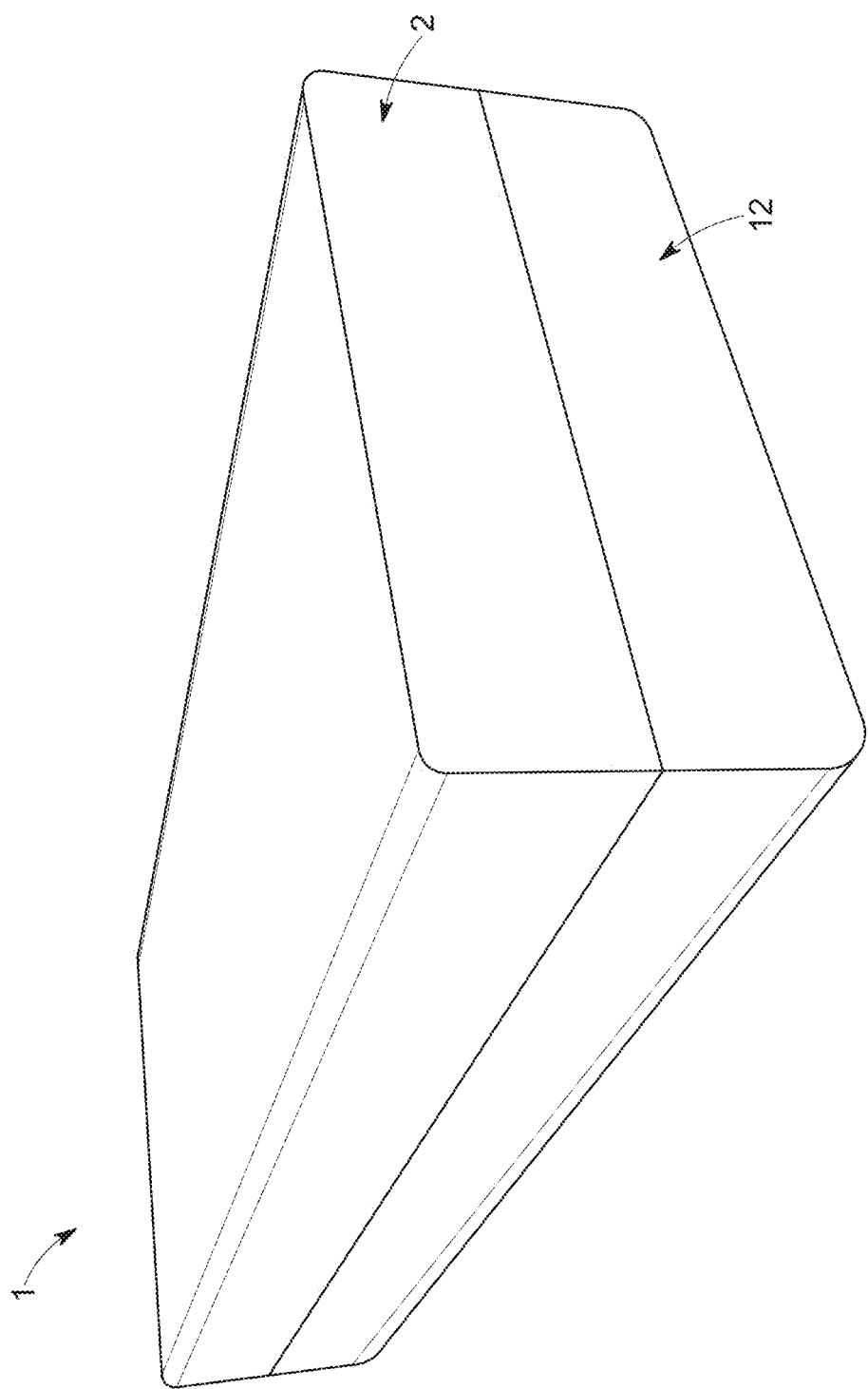
FIG. 1 shows an exemplary camper in closed configuration.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure as defined by the appended claims.

DETAILED DESCRIPTION OF SPECIFIC EMBODIMENTS

As used herein, "rigid" refers to having a hard, substantially inflexible material such as composite material, metal, plastic, wood or a combination thereof.

As used herein, "soft-shell" refers to having a soft, substantially flexible, or fragile shell such as canvas, fabric, plastic, nylon, vinyl, or a combination thereof.

As used herein, "insect-resistant" refers to substantially preventing insects from entering.

As used herein, "water-resistant" refers to substantially preventing water from entering.

Described herein are devices, components, assemblies, systems, methods, etc. for shelters and campers. The description and accompanying figures, which describe and show certain embodiments, are made to demonstrate, in a non-limiting manner, several possible configurations of shelters, campers, apparatuses, components, assemblies, systems, etc. and various methods of using them according to various embodiments and features of the present disclosure. Accordingly, the present disclosure is not limited to the specific embodiments described. Rather, the inventive principles associated with the embodiments described herein, including with respect to the apparatuses, devices, components, assemblies, systems, methods, etc. described herein, may be applied in a variety of ways, including to other types of apparatuses, devices, components, assemblies, systems, methods, etc. General and specific apparatuses, devices, components, assemblies, systems, methods, etc. are described herein sufficiently to enable one to develop a variety of implementations/applications without undue experimentation. In the development of particular applications, numerous implementation-specific decisions will be made to achieve the design-specific goals, which will vary from one implementation/application to another. It will be appreciated that, having access to this disclosure and reading this disclosure, such a development effort would be a routine undertaking for persons of ordinary skill in the art.

This application does not intend to distinguish between components that differ in name but not function. In the following discussion and in the claims, the terms "including," "includes," "comprising," "have," and "has" are used in an open-ended fashion, and thus should be interpreted to mean "including, but not limited to." The word "or" is used in the inclusive sense (i.e., "and/or") unless a specific use to the contrary is explicitly stated.

A hybrid shelter or camper that provides the portability and compactness of a soft-shell, fabric tent with the protection, comfort, and other benefits of a hard-sided camper. The shelter or camper may provide rigid wall, roof, and/or floor panels or components that, along with an attached fabric exterior cover, may be collapsed into a substantially more compact case when closed for transportation and storage, for example on the roof of a vehicle, in or over a pickup truck bed, on a trailer, or on another suitable platform or structure. The rigid walls, roof and/or floor may be unfolded, erected, and/or moved into position to form a hard-sided enclosure that is large enough to allow occupants to sleep, sit, and/or stand inside it. The enclosure formed from the rigid walls, roof, and/or floor may also provide better security from animals and intruders, as compared with existing ground tents and rooftop tents. The rigid panels of the enclosure may also provide a suitable structure to temporarily, semi-permanently, or permanently attach fixtures such as lighting, televisions, tablets or screens, ventilation fans, ventilation ports, or other suitable fixtures. The rigid sides of the enclosure may be folded into as many panel sections or may separate into as many panel sections as may be necessary to fit into a more compact case, when the shelter is collapsed for storage and/or transportation. Numerous folds in the panels or joints between multiple panels and panel sections may be difficult or cumbersome to seal from smaller insects and water, when the shelter is unfolded or erected for use. In order to provide more effective, simpler, and lighter weight sealing of the numerous joints, the shelter or camper may also contain a soft, water-proof or water-resistant fabric shell, cover, or lining that may enclose the rigid panels and/or panel sections or components, providing a water-tight and insect-tight barrier when the panels are unfolded, erected, or otherwise moved into position for use. In combination, the rigid panels and exterior soft cover may provide increased protection from animals, insects, intruders, and inclement weather, and may provide many of the comfort, convenience, and other benefits of hard-sided campers yet still be able to fold or separate into smaller sections in order to pack down into a comparatively smaller case with a smaller footprint. Enclosing the rigid panels beneath a fabric liner, offers greater flexibility in the choice of rigid panel material that may be used. For example, the rigid panels may not have to be waterproof, water-resistant, or insect-proof to be used. They may be constructed of solid material, porous material, perforated material, or material with large or small gaps and/or holes to achieve the desired strength, weight, and other desirable properties. The panels may also be upholstered or covered with fabric on one or both sides that may offer greater comfort, aesthetics and increased insulation, as compared with tent walls. Additionally, having the rigid panels under a fabric liner, may offer greater flexibility in the choice of hinges, latches, and/or locks between adjoining panels, without the need to seal the gaps between panels. For example, 2-way hinges that allow doors and windows to swing in both directions may be used, without the need for a weather seal between them and the panels they attached to. The fabric liner may also have more desired properties to reduce weight and improve function. For example, it may be constructed of lighter material and/or clear material since the rigid panels under it will support it and may provide increased privacy. Panels that fold into much smaller sections and the fabric tent liner may be packed into a case with a much smaller footprint as compared with many existing rooftop tents or campers.

FIG. 1 Shows a view of an exemplary shelter that may be configured as a portable shelter or collapsible camper 1 in a closed configuration. Camper 1 may be configured as a hybrid, collapsible camping unit consisting of both fabric tent material and rigid wall panels that may give it the water- and insect-proof benefits of a fabric tent; the comfort, security, and increased weather protection that hard-sided campers offer without complex sealing; and be able to collapse and be stored in a case, as shown in FIG. 1, compact enough for transportation on a vehicle roof rack, on a trailer, or attached to or placed on any other suitable platform or surface; or inside a pickup truck bed, SUV, van, trailer, other vehicle or container. The top lid 2 and bottom lid 12 of camper 1 may form a closed, tightly sealed case as shown in FIG. 1. The sealed case may contain some or all of the components necessary to erect camper 1. The case may be sufficiently dimensioned to contain the tent; rigid roof and wall panels, and panel sections; mattresses, mattress platforms, and/or bedding; and electronic components, if any, such as fans, batteries, lights, or other electronic accessories or components. Top lid 2 and bottom lid 12 may be constructed of a rigid material such as plastic, fiberglass, carbon fiber, metal, wood, and/or another suitable, rigid material; or top lid 2 and bottom lid 12 may be constructed of a soft material over a rigid frame or may be comprised of a semi-rigid material.

Top lid 2 and bottom lid 12 may contain seals, latches, locks, hinges, and/or zippers, or portions of these components that may allow the lids to remain tightly sealed while camper 1 is in transit or storage, preventing water and/or insects from entering the closed camper, and may prevent accidental or unwanted opening of the closed camper. Top lid 2 and bottom lid 12 may also contain electrical ports, to connect internal electrical components, such as lights, fans, power outlets, or any other electrical device that may be inside to an external power source. Top lid 2 and bottom lid 12 may also contain ports for heating and cooling equipment or for ventilation. Top lid 2 and bottom lid 12 may also contain ports for plumbing fixtures, if any. Top lid 2 and bottom lid 12, may also contain features to make the case more aerodynamic when transported on top of a vehicle, for example. These features may include wind fairings, diffusers, ribs, spoiler, wings, or any other beneficial feature. Top 2 lid may also contain solar panels to charge batteries either located externally or stored inside the case.

Figure 2:
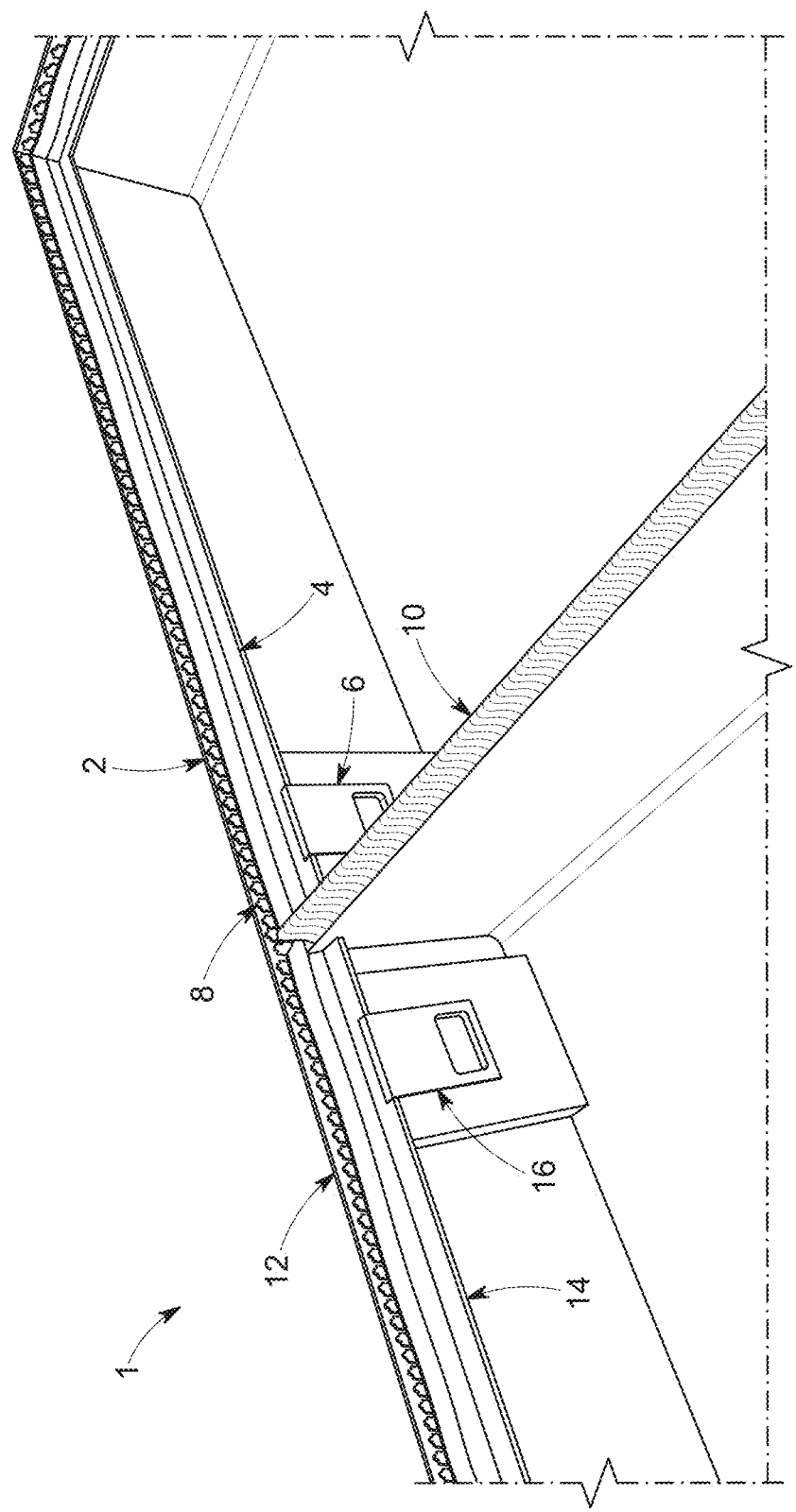
FIG. 2 shows the internal surface of the lids of the camper of FIG. 1.

As shown in FIG. 2, top lid 2 and bottom lid 12 may each further contain internal framing 4 and 14, respectively (e.g., aluminum framing on the interior side of rigid, semi-rigid, or soft lids), that rigid wall panels and/or other components may attach to. Alternatively, top lid 2 and bottom lid 12 may be sufficiently sturdy enough (e.g., sturdy plastic lids with attachment points for rigid panels) to allow direct attachment of rigid wall panels and/or other components to them, without the need for internal framing 4 and 14. Lids 2 and 12, together with internal framing 4 and 14, if present, when laid flat, as partially shown in FIG. 2, would form the floor of camper 1 and foundation for attachment of other components, such as rigid wall panels and the tent. Attachment points for rigid panels, whether in internal framing 4 and 14, or if directly on the lids, may be at a point, lower than the top of the lids, as shown in FIG. 2, further securing the rigid panels in place and providing extra support to prevent them from extending beyond the perimeter of the lids if pressure on the rigid panels is placed on them from inside, for example, by a person leaning against the erected camper walls.

Lids 2 and 12 may further contain a method for attaching a tent to it. FIG. 2 shows a portion of tent-floor attachment 8, which may contain portions of zippers, hook and loop fasteners, snaps, a flexible channel and/or components that may be inserted into a flexible channel, glue, screws, magnets, or some combination of these mechanisms, running along the interior side of the three outer edges of lids 2 and 12 (e.g., the three sides of lids 2 and 12 that are not joined) and crossing over the joint between lids 2 and 12, so that it may form a continuous attachment point across both lids for attachment of the tent. Lid joint 10, between lids 2 and 12, as shown in FIG. 2, may form a continuous joint between the lids such that it, in conjunction with or attached to tent-floor attachment 8, may form a barrier between the interior and exterior of camper 1, capable of preventing insects or rodents from entering, when expanded for use. Lid joint 10, may be a soft hinge (e.g., a living hinge between lid 2 and lid 12) or may be used in conjunction with standard, rigid hinges connecting lids 2 and 12, that may protect, cover, or close the gap between the lids, when they are opened.

Figure 3:
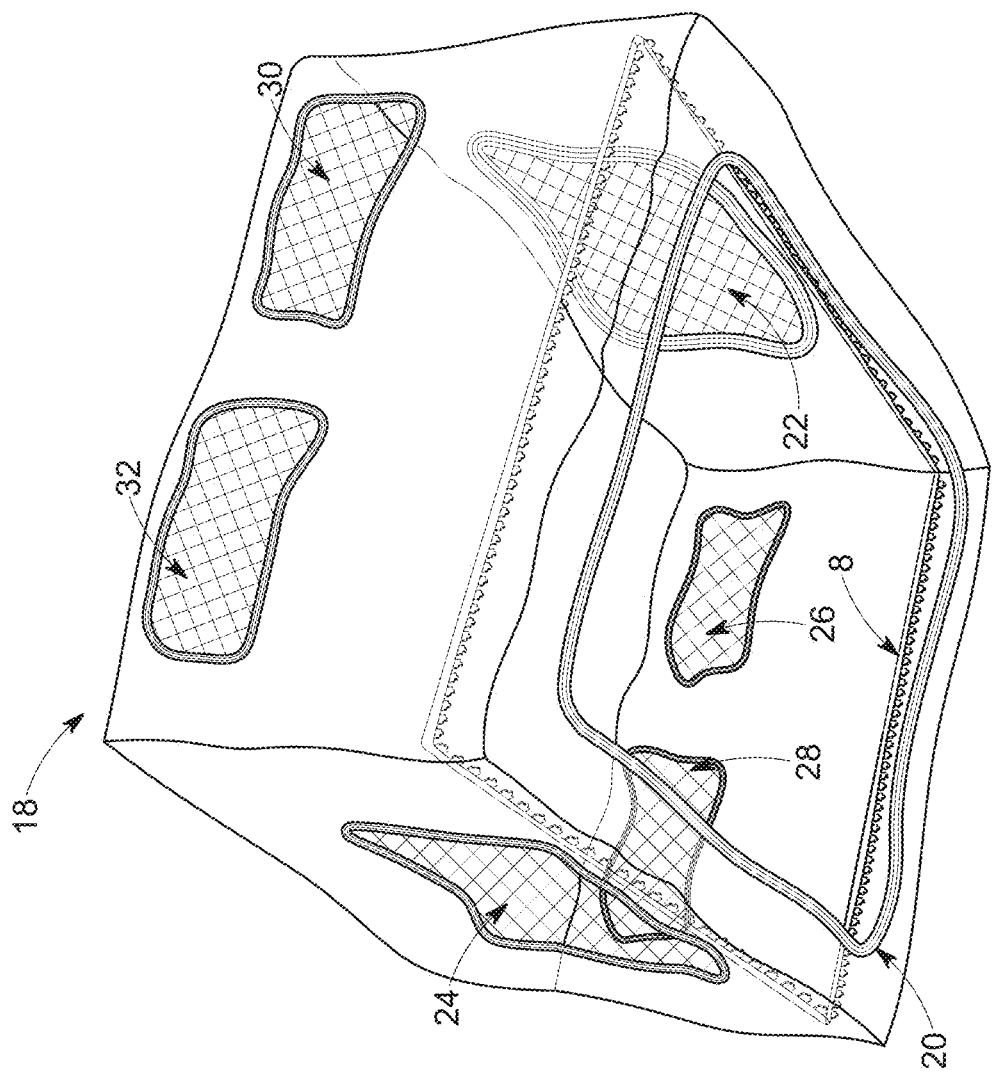
FIG. 3 shows an exemplary tent of the camper of FIG. 1.

Tent 18 may contain portions of tent-floor attachment 8, as shown in FIG. 3, that connect with those portions of tent-floor attachment 8 found in lids 2 and 12, as partially shown in FIG. 2. Portions of tent-floor attachment 8 in tent 18 may contain glue, screws, snaps, zippers, hook and loop fasteners, magnets, channels and/or components that may be inserted into channels; or may contain some combination of glue, screws, snaps, zippers, hook and look fasteners, magnets, channels and/or components that may be inserted into channels; or other mechanisms to permanently, semi-permanently, or temporarily attach tent 18 to lids 2 and 12, such that it may be a continuous attachment between the tent and floor, when the lids are opened and laid flat for use as the camper floor, and between the tent and lids, when the case is closed for storage and/or transportation, so that there is no need to detach or reattach the tent, when transitioning between open and closed configurations. Portions of tent-floor attachment 8 may be located in the interior surface of lids 2 and 12, as described previously, and the corresponding portions may be located at a position a few inches (e.g., 1 to 24 inches, or more or less) above bottom tent seam 20, as shown in FIG. 3, to allow a bottom portion of tent 18 to be pulled below and over the attachment point of the tent to the lids, when the lids are opened and laid flat for use, such that the attachment point is shielded from rain.

Tent 18 may be constructed of material typically used for tents, such as plastic, vinyl (or polyvinyl chloride), nylon, canvas, or any other soft material that may be resistant to water, insects and/or rodents; or may be impervious to water, insects, and/or rodents; or may be a combination of water-resistant and waterproof material. Some or all portions of tent 18 may be transparent, opaque, or some combination of transparent and opaque materials. Some or all portions of tent 18 may be constructed of a stretchable or non-stretchable material. Tent 18 may also contain air vents, and/or may contain openings or ports that may correspond with openings or ports in lids 2 and 12, and/or with openings and ports in the rigid roof and wall panels. As shown in FIG. 3, tent 18, may contain doors 22 and 24, and windows 26-32. The doors and windows may each contain zippers, hook and loop fasteners, snaps, magnets, or any other mechanism that may be used to easily open and close the tent doors and windows. Tent doors 22-24 and tent windows 36-32 may also each contain insect screens. The tent doors and windows may be opened such that their screens may remain closed, allowing only air to pass through, or may be fully opened, similar to how typical tent windows, doors, and screens work.

Figure 4:
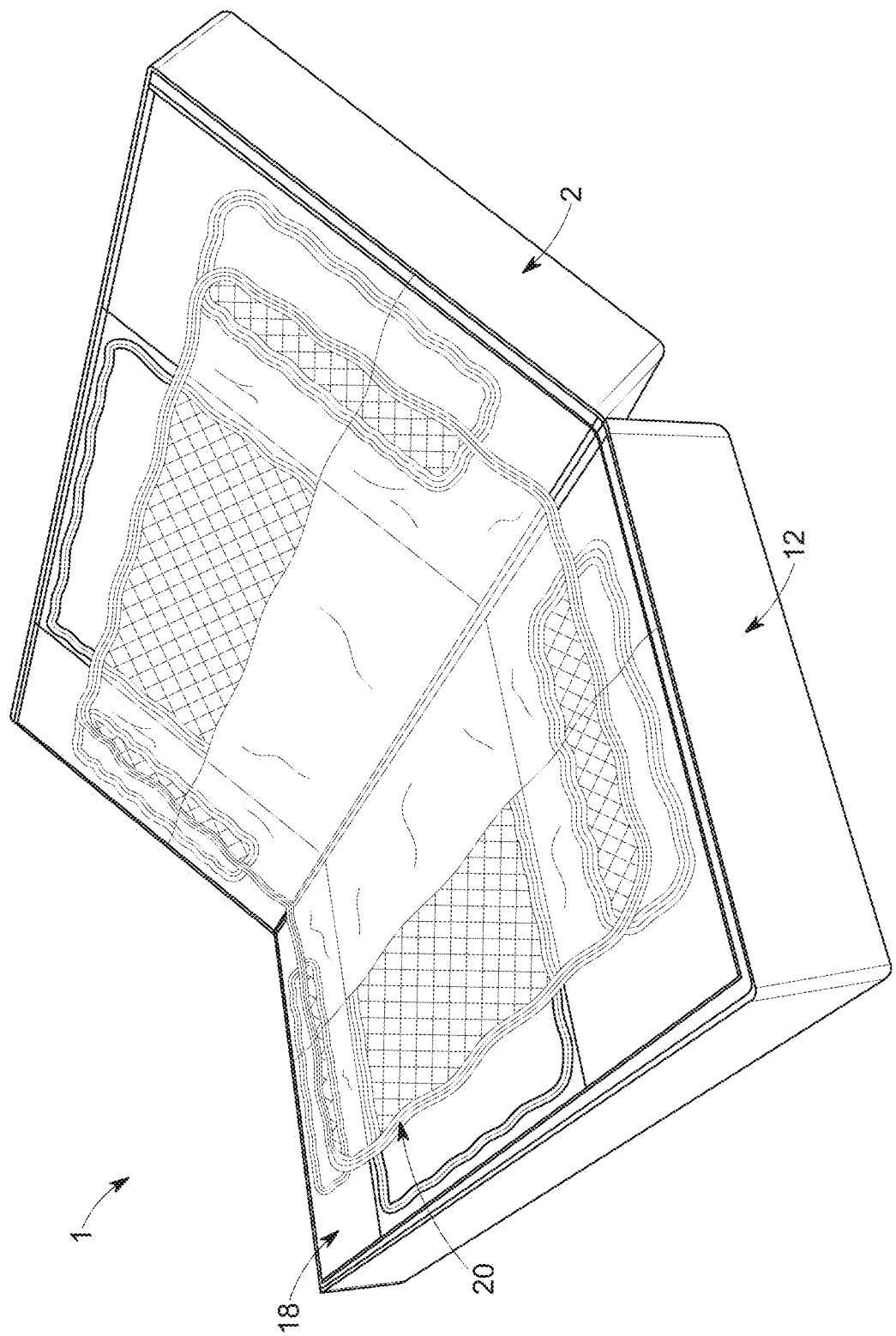
FIG. 4 shows the camper of FIG. 1 in a first transition between closed and open configurations.

To transition camper 1 from its closed configuration, as shown in FIG. 1, Any latches, locks or other mechanisms used to secure top lid 2 to bottom lid 12, may be unlatched, unlocked, unzipped, removed, or otherwise disengaged or disconnected to allow top lid 2 to partially separate from bottom lid 12. Similar to hard-sided luggage, top lid 2 and bottom lid 12 of camper 1 may be partially separated, as shown in a first transition in FIG. 4, to allow camper 1 to be erected. Some components of camper 1 may be stored in either top lid 2, bottom lid 12, both lids, or between lids and may be further constrained by tent-floor attachment 8; tent 18; bottom tent seam 20; and/or any additional straps, if necessary, such that they do not fall out during opening or closing procedures, as shown in FIG. 4.

Figure 5:
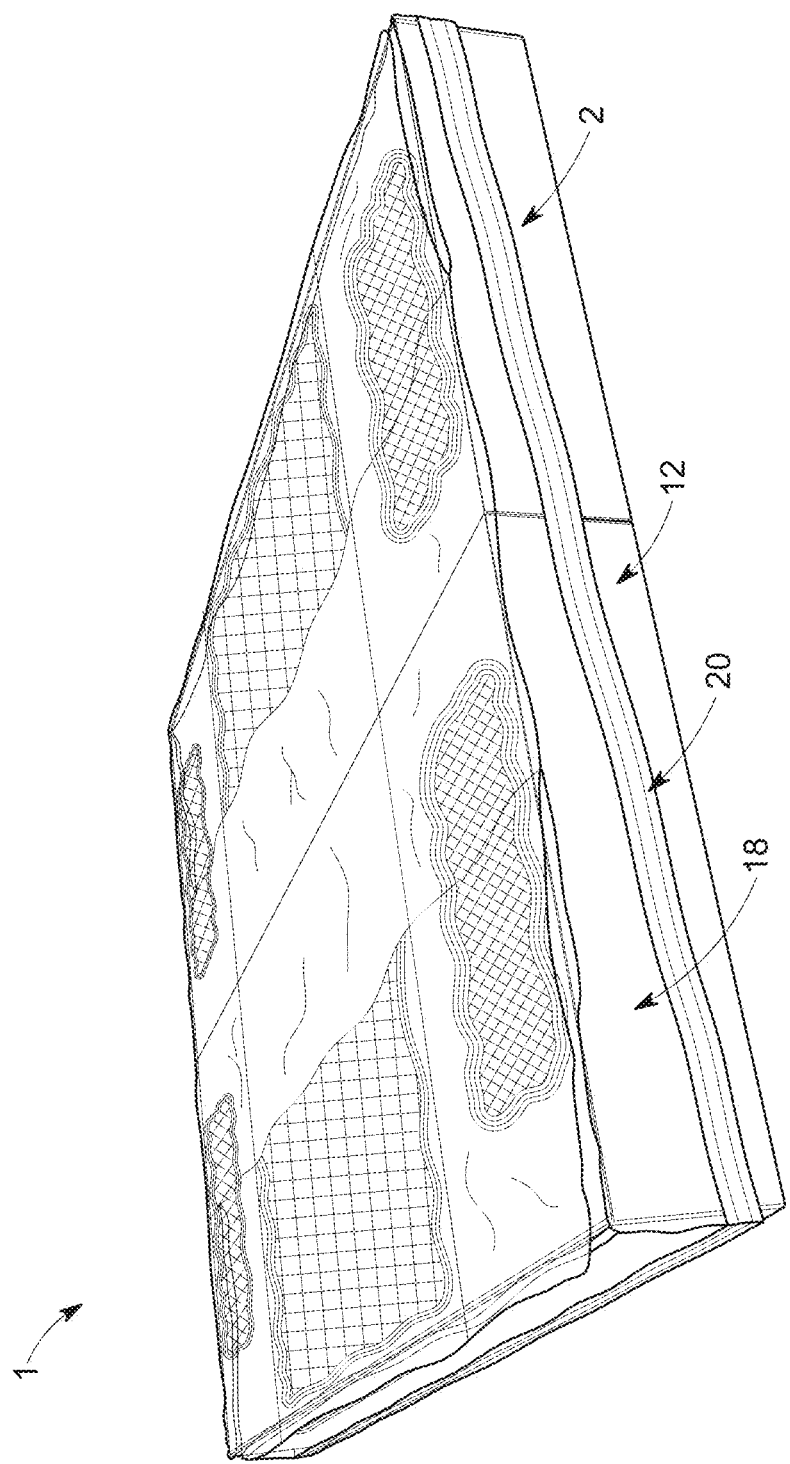
FIG. 5 shows the camper of FIG. 1 with a bottom portion of the tent being pulled and stretched over the top and bottom sections of the case.
Figure 6:
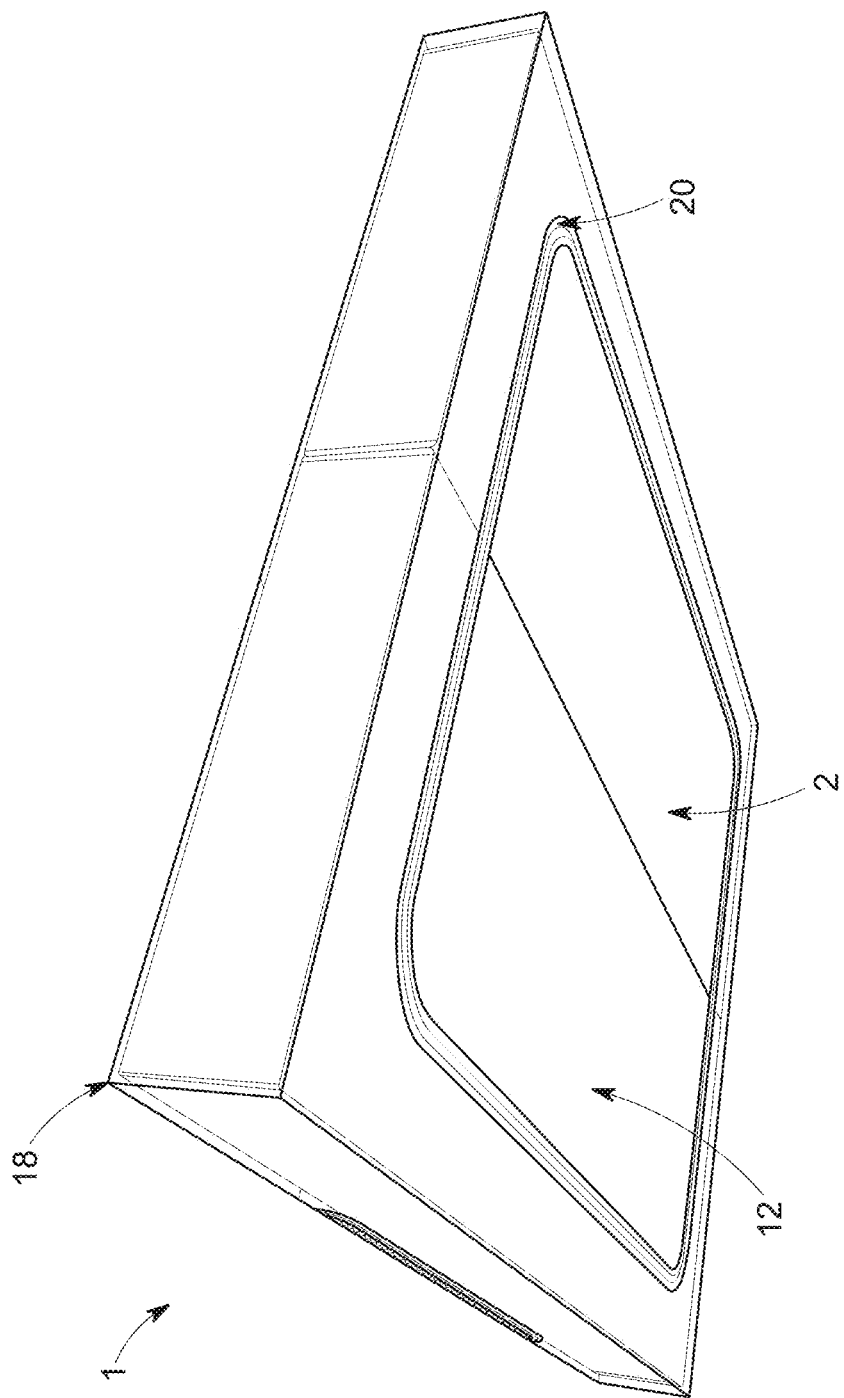
FIG. 6 shows a bottom perspective view of the camper of FIG. 1 with the tent fitted firmly underneath the lids.

Bottom tent seam 20 of tent 18 may be an elastic seam (e.g., a highly elastic seam) that may serve two purposes: to further constrain components inside lids 2 and 12, with or without additional strapping, as the case is being opened or closed, as described above and shown in FIG. 4; and to extend the tent firmly under or onto lids 2 and 12, when they are fully opened and laid flat to form the floor of camper 1, as shown in FIGS. 5 and 6. Attachment of tent 18 to lids 2 and 12 with tent-floor attachment 8, at a position higher than the bottom of the tent, as previously shown in FIG. 3, and an elastic bottom tent seam 20, may allow the bottom portion of tent 18, below tent-floor attachment 8, where it may attach to lids 2 and 12, to be pulled down and over lids 2 and 12, as shown in transition in FIG. 5. FIG. 6 shows a bottom portion of tent 18 pulled firmly over the floor of camper 1, formed by the open lids 2 and 12, and held firmly in place by bottom tent seam 20 if bottom seam 20 is an elastic seam. Alternatively, the bottom portion of tent 18 may just be pulled over or past the attachment point of tent 18 and lids 2 and 20 to fit firmly around the outside perimeter of the lids rather than being pulled completely under, such that the attachment point is still protected from rain. Alternatively, bottom seam 20 may not be elastic at all, and may just be draped over the lids such that the attachment point of the tent to the lids is still protected from rain.

Figure 7:
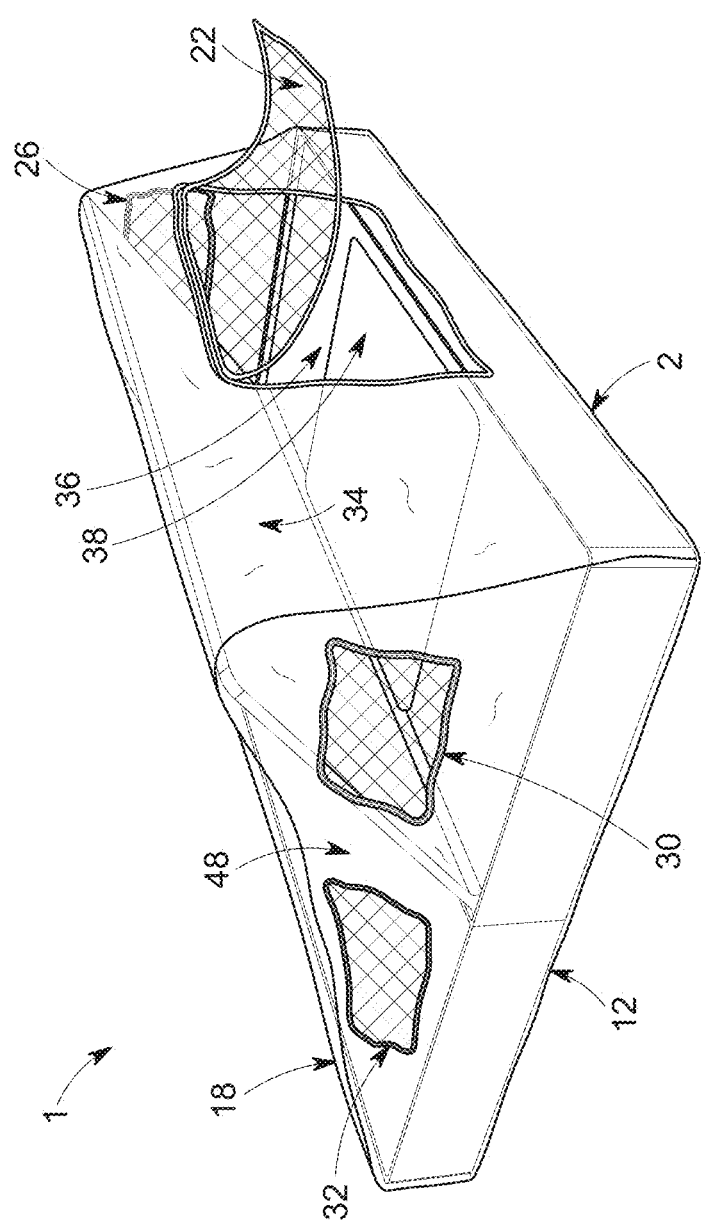
FIG. 7 shows how the rigid internal panel walls of the camper in FIG. 1 may be accessed and unfolded via the tent door in a first transition to erect the rigid panels.

As shown in FIG. 7, tent door 22 and/or tent door 24 (not shown in this figure) may be used to gain access to the interior of camper 1 in order to unfold and erect rigid roof panels 34 or 48; rigid side panels 36 or 50 (not shown in this figure); rigid end panel sections 40, 44, 54 and/or 58 (none of which are shown). A further benefit of having the rigid panels that form a tent frame under the tent, even prior to it being erected, is that the remaining steps of expanding the camper may occur under the loose tent, which may provide some shelter from failing rain.

Figure 8:
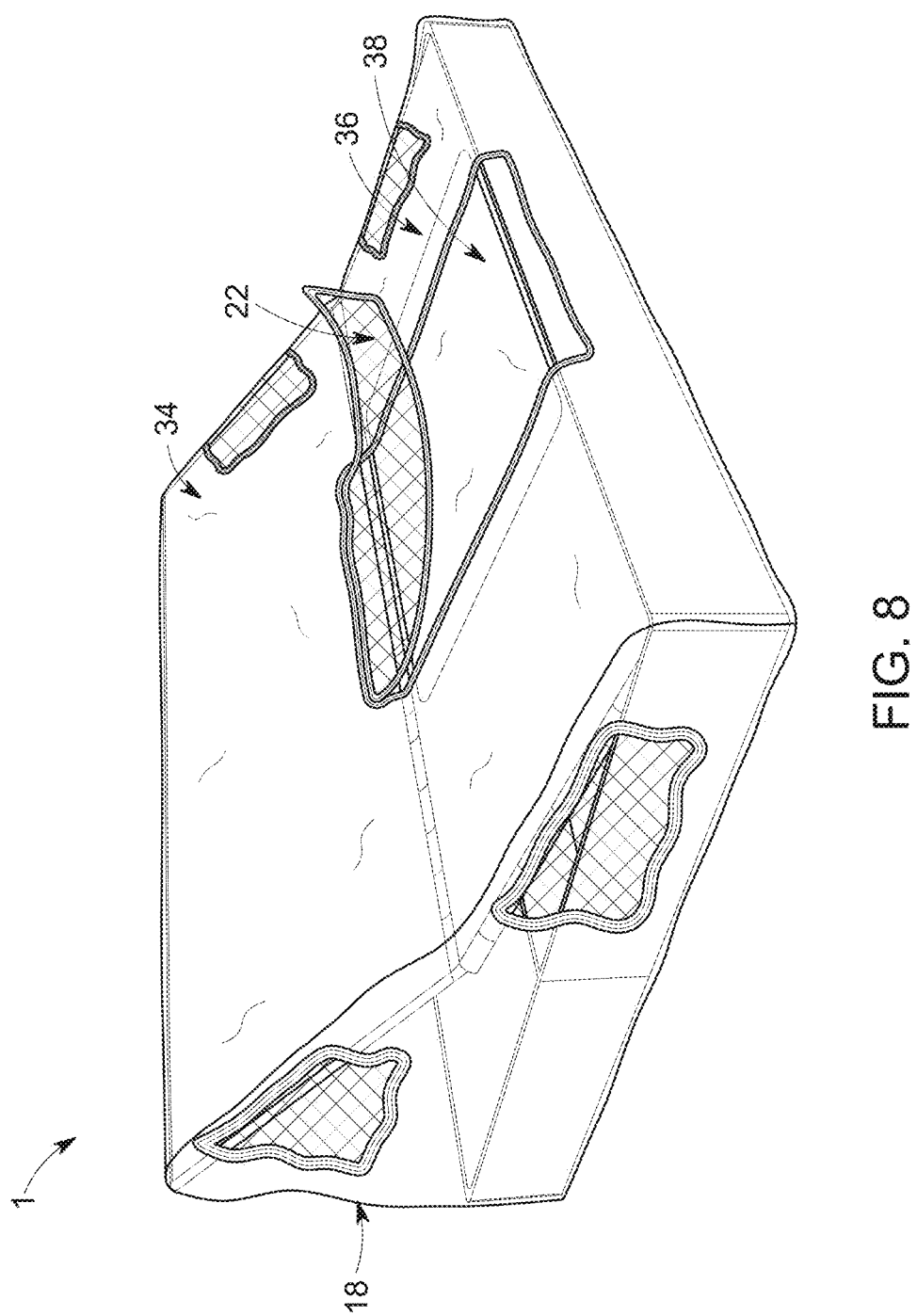
FIG. 8 shows how a roof panel section of the camper in FIG. 1 may be unfolded in a second transition to erect the rigid panels.
Figure 9:
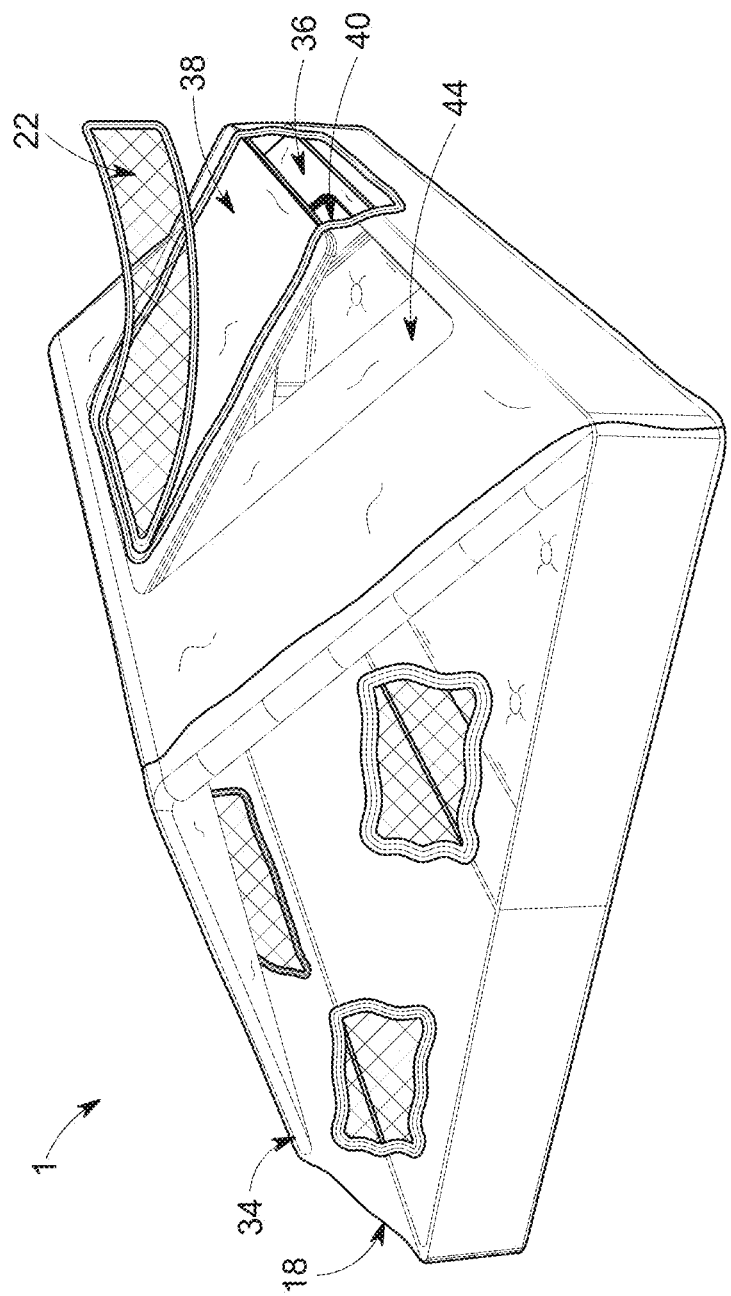
FIG. 9 shows how all of the rigid panels and panel sections connected on side of the camper in FIG. 1 may be lifted together and moved into place in a third transition to erect the rigid panels.
Figure 10:
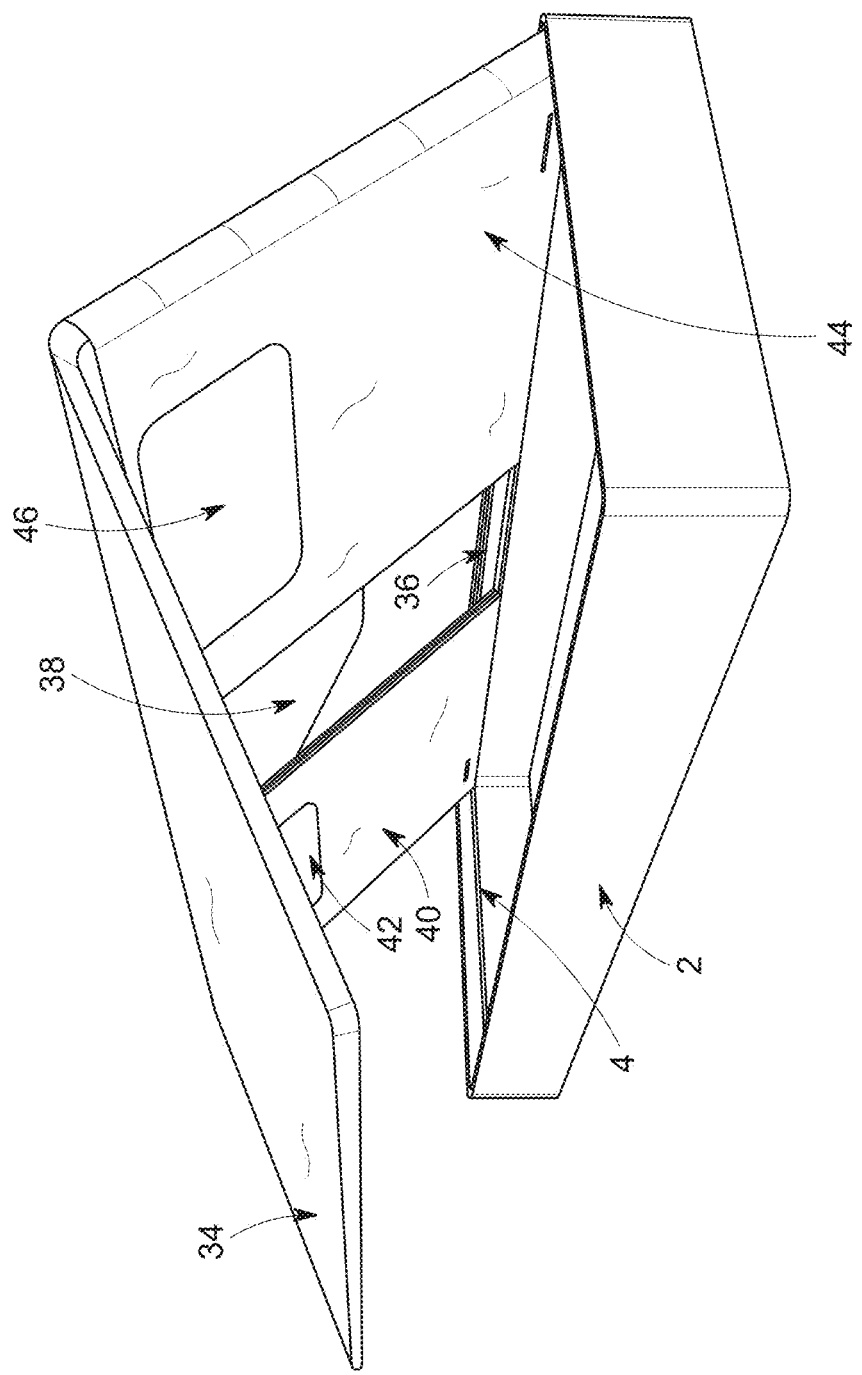
FIG. 10 shows further detail of how the rigid panels of FIG. 9 may be connected.
Figure 11:
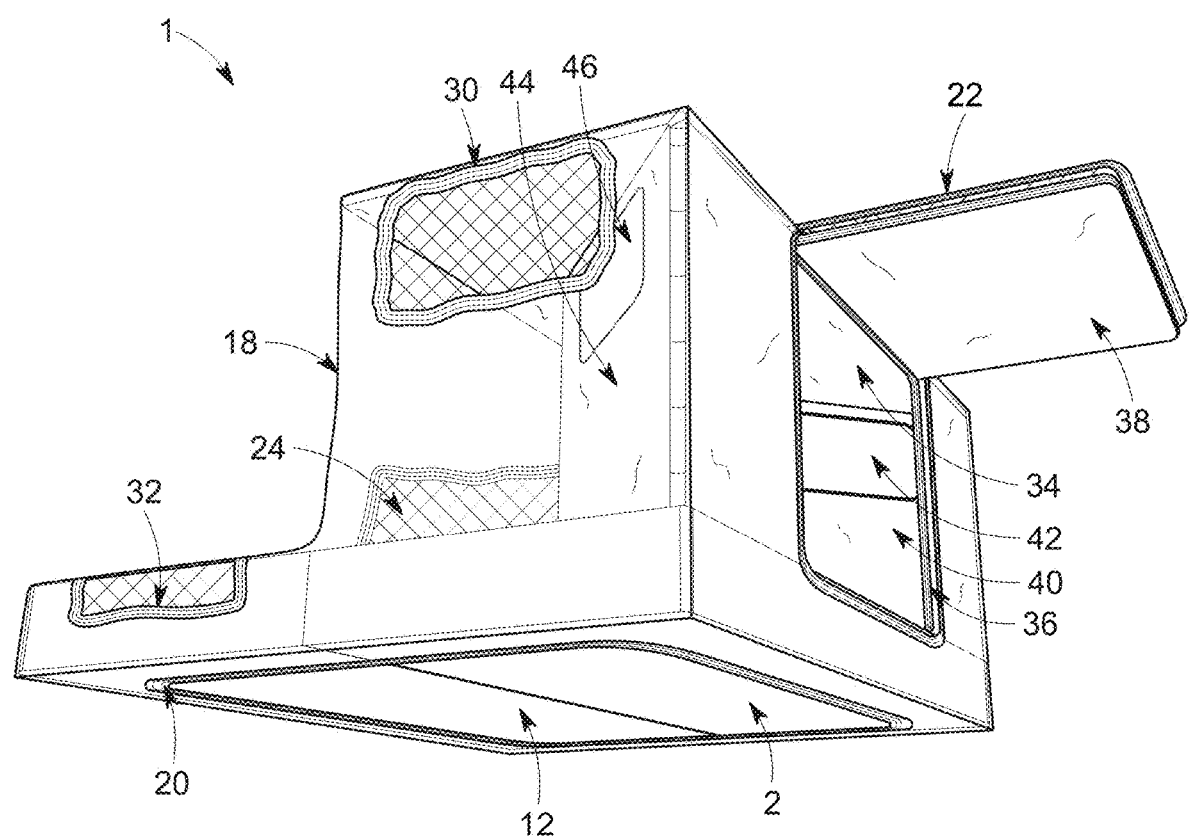
FIG. 11 shows how a roof panel, side panel, panel door, and two end panel sections of the camper in FIG. 1 may be moved into position in a fourth transition to erect the rigid panels.
Figure 12:
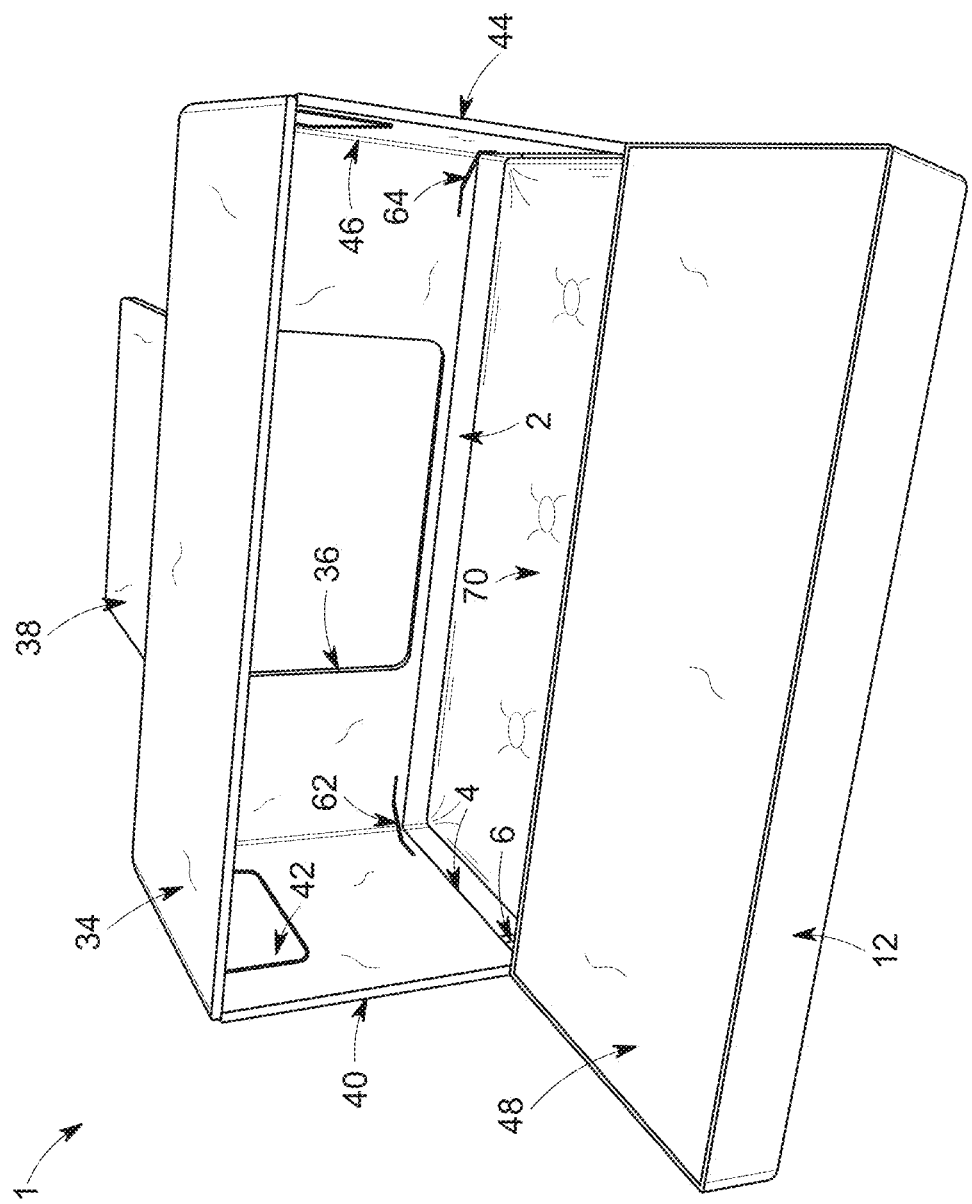
FIG. 12 shows rigid panels raised on side of the camper in FIG. 1, with the tent removed, to show detail.

It would be beneficial for a person to be able to quickly and intuitively unfold, erect, and/or otherwise move the rigid panels and/or panel sections that comprise the rigid tent frame into place to expand camper 1 for use. Rigid panels and/or panel sections may be hinged and/or latched to adjoining panels and/or panel sections and/or may be binged and/or latched to internal frames in the lids, if present, or may be hinged and/or latched directly to the lids, allowing a person to easily erect the rigid tent frame by simply moving panels, without having to determine where each and every panel and/or panel sections goes, as would be the case if they were not attached at all on any end. Once access is gained to the interior of tent 18 through tent door 22, in a first transition to begin erecting the rigid panels, roof panel 34 which may be hinged to side panel 36 (e.g., connected by a 270-degree hinge), may be lifted from its unhinged end, closest to the tent door opening, as shown in FIG. 7. Roof panel 34 may be flipped over at about 270 degrees relative to side panel 36, along its joint with side panel 36, as shown in FIG. 8. Once roof panel 34 is flipped over, access to side panel 36 and panel door 38 may be gained. Panel door 38 may be opened upward, and a person may be able to lift all of the panels and panel sections connected to side panel 36, such as roof panel 34, panel door 38, and end panel sections 40 and 44 and their windows, as shown in FIG. 9. FIG. 10 shows further detail of how all of the panels on one side of camper 1 (i.e., roof panel 34, side panel 36 connected to panel door 38, end panel section 40 connected to panel window 42, and end panel section 44 connected to panel window 46), may be hingedly connected so that they may be raised together. As shown in FIG. 10, side panel 36 is hinged to internal frame 4 in top lid 2. Roof panel 34 is hinged to side panel 36 by use of a 270-degree hinge or other hinge or connection type that allows a 270-degree rotation of the roof panel in relation to the side panel. Panel window 42 is hinged to end panel section 40 and panel window 44 is hinged to end panel section 44, and both end panel sections are also hinged to side panel 36. Door panel 38 is also hinged to side panel 36. By lifting panel 36 along its hinge with internal frame 4, all panels, panel sections, door and windows connected directly or indirectly to side panel 36 may also be lifted and moved further into position for erection of the tent and expansion of camper 1. With roof panel 34 in a substantially horizontal position above and at about a 90-degree angle to side panel 36, while resting above end panels 40 and 44, and with tent door 22 and panel door 38 in open position, a person may be able to enter camper 1 or reach further in, in order to complete the unfolding of end panel sections 40 and 44, as shown in FIG. 11. One exemplary hinge to connect end panel sections 40 and 44 to side panel 36 is shown as corner hinges 62 and 64 in FIG. 12. Corner hinges such as these may be used at all 4 interior corners of Camper 1. Corner hinges 62 and 64 may be pushed in at their centers, which may allow end panels 40 and 44 to remain locked in open position, relative to side panel 36, similar to how the hinges on folding table legs may be pushed in to prevent unwanted folding when in use. The unattached ends of end panels 40 and 44 may be latched to top lid 2 with two top lid internal frame latches 6, located at the front and back of top lid 2. One of Internal frame latch 6 in the front of top lid 2 is shown in FIG. 12, and a second internal frame latch 6 may be located at the rear of top lid 2. Alternatively, end panels 40 and 44 may contain the panel latches that may attach to receptacles in top lid internal frame 4, or directly in top lid 2, if no internal frame is present. End panels may also latch (e.g., using panel latches) to roof panel 34 and to the adjoining end panels sections on the other side of camper 1, once that side is erected, as further described below.

Figure 13:
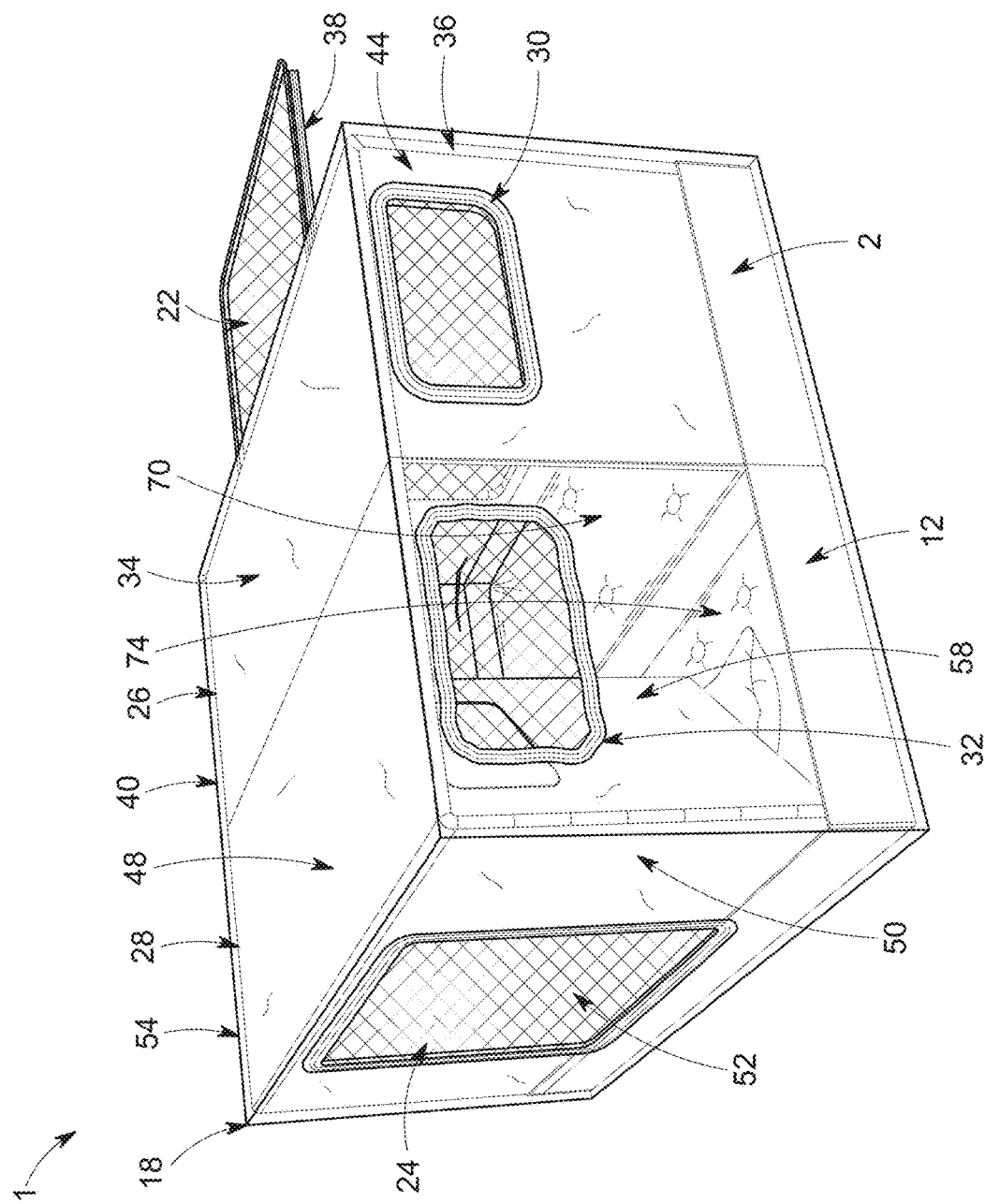
FIG. 13 shows the last rigid panels being moved into place in a last transition to erect the rigid panels of camper 1.
Figure 14:
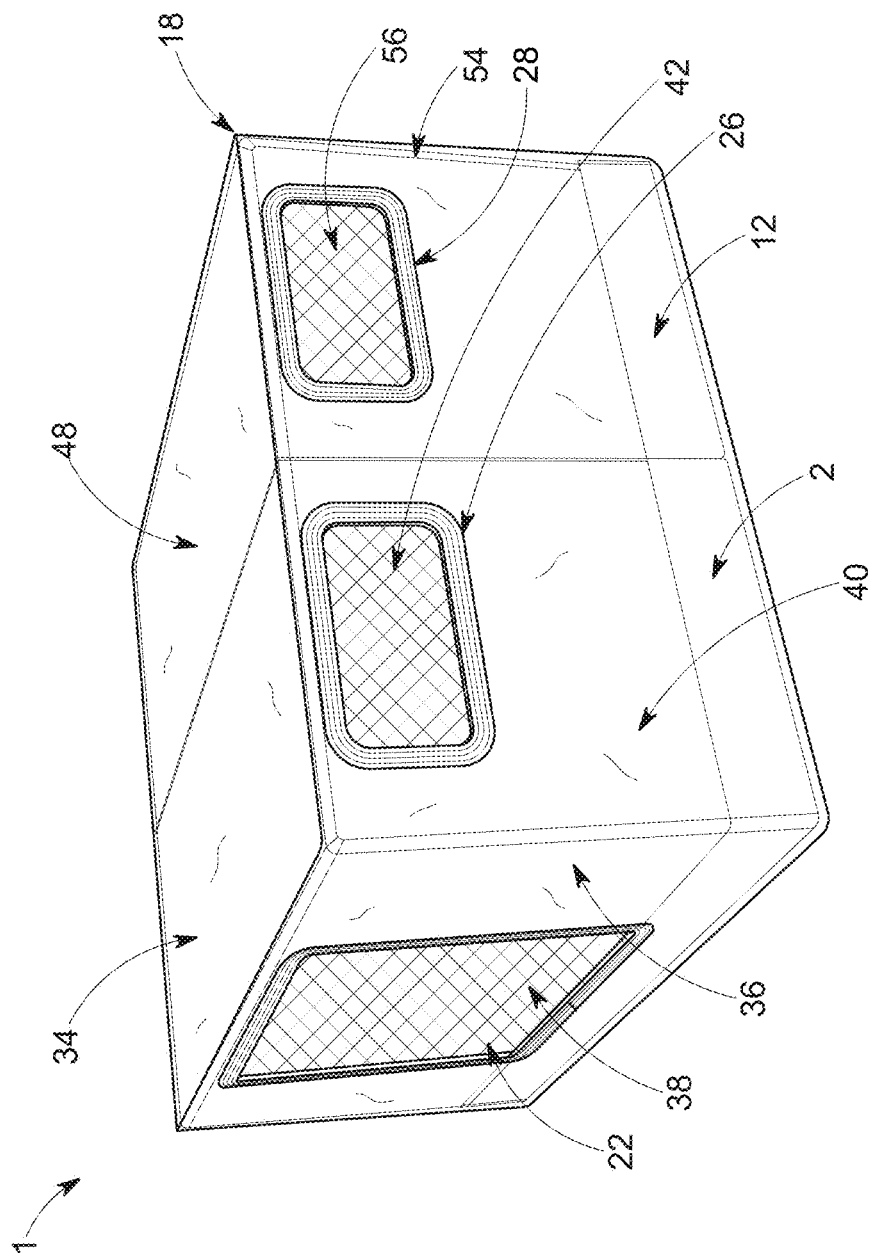
FIG. 14 shows a front, top perspective view of the camper in FIG. 1, fully expanded.
Figure 15:
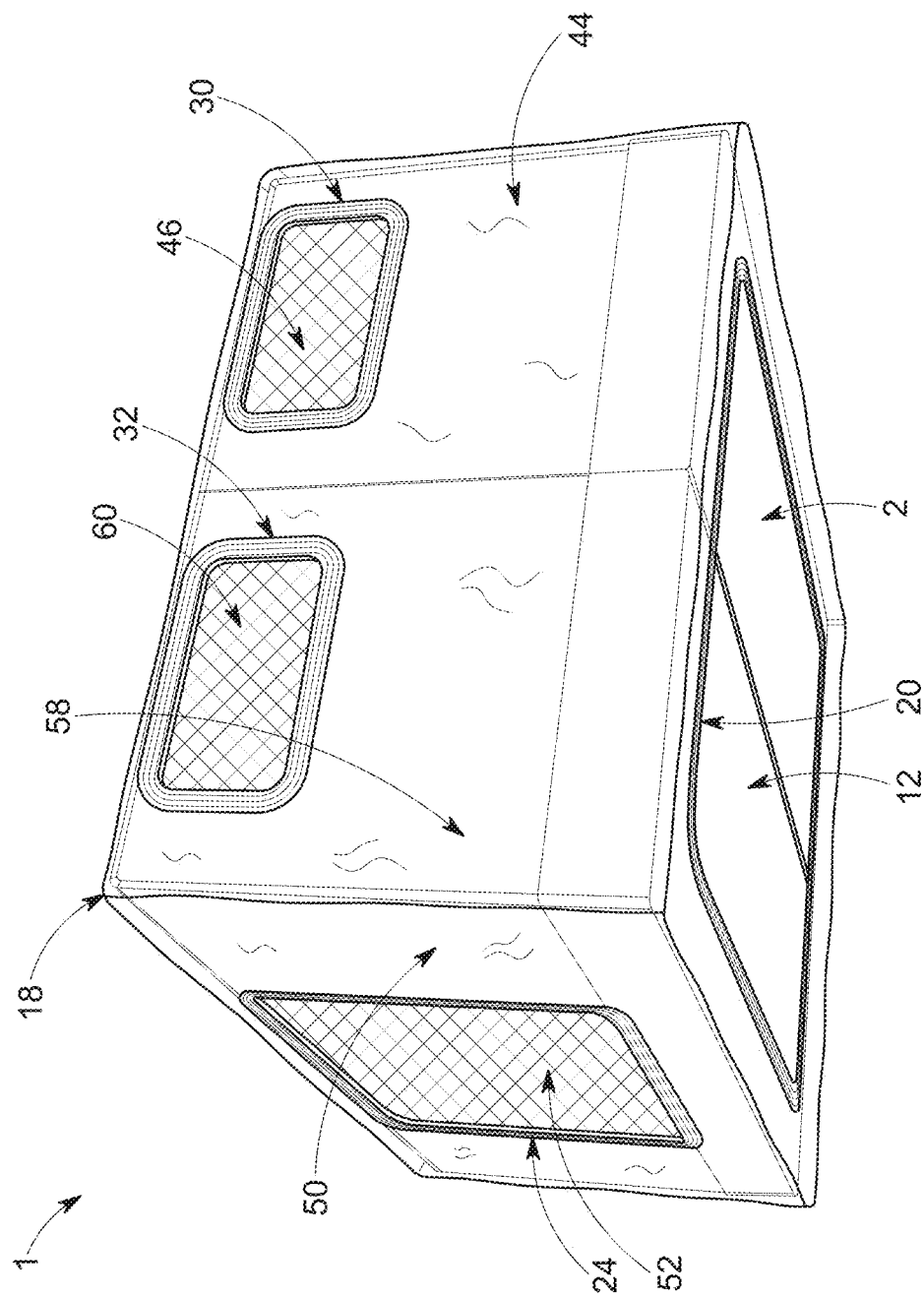
FIG. 15 shows a rear, bottom perspective view of the camper in FIG. 1, fully expanded.

Once the rigid panels on one side of camper 1 have been moved, latched, and/or locked into position, rigid panels on the other side may similarly be lifted, repositioned, moved, or otherwise situated for use, as shown in transition in FIG. 13. Once one side of camper 1 is expanded, and tent 18 is partially erected, a person may flip over roof panel 48, lift side panel 50 along its hinge with bottom lid internal frame 14 (shown previously in FIG. 2) in bottom lid 12, along with panel door 52 attached to it, and begin to unfold end panels 54 and 58 with panel windows 56 and 60, respectively, attached to them, as shown in transition and nearly complete in FIG. 13. Corner hinges 66 and 68, shown in FIG. 17, connecting end panels 54 and 58 to side panel 50, similar to how corner hinges 62 and 64 connect end panels 40 and 44 to side panel 36, may be locked in place to prevent unwanted folding of end panels 54 and 58. Two of bottom lid internal frame latches 16 (i.e., one internal frame latch 16 at the front of bottom lid 12 and another internal frame latch 16 at the rear of bottom lid 12), as partially shown previously in FIG. 2, may be latched to end panels 54 and 58, or alternatively, end panels 54 and 58 may each contain panel latches that may connect to receptacles in bottom lid internal frame 14, if present, or directly into bottom lid 12, if not. Panel latches may connect roof panels 34 and 48 to each other, end panels 40 and 54 to each other, and end panels 44 and 58 to each other in a fully expanded camper 1, as shown in FIGS. 14 and 15. The rigid roof and wall panels, when connected by hinges to adjoining panels or the lids of the case, moved into place, and latched to adjoining panels or the lids of the case, may add structural support to the camper. With camper 1 wall panels fully erected, the bed system (i.e., mattress, mattress platforms, and any other bedding) may be moved into place for use.

Figure 16:
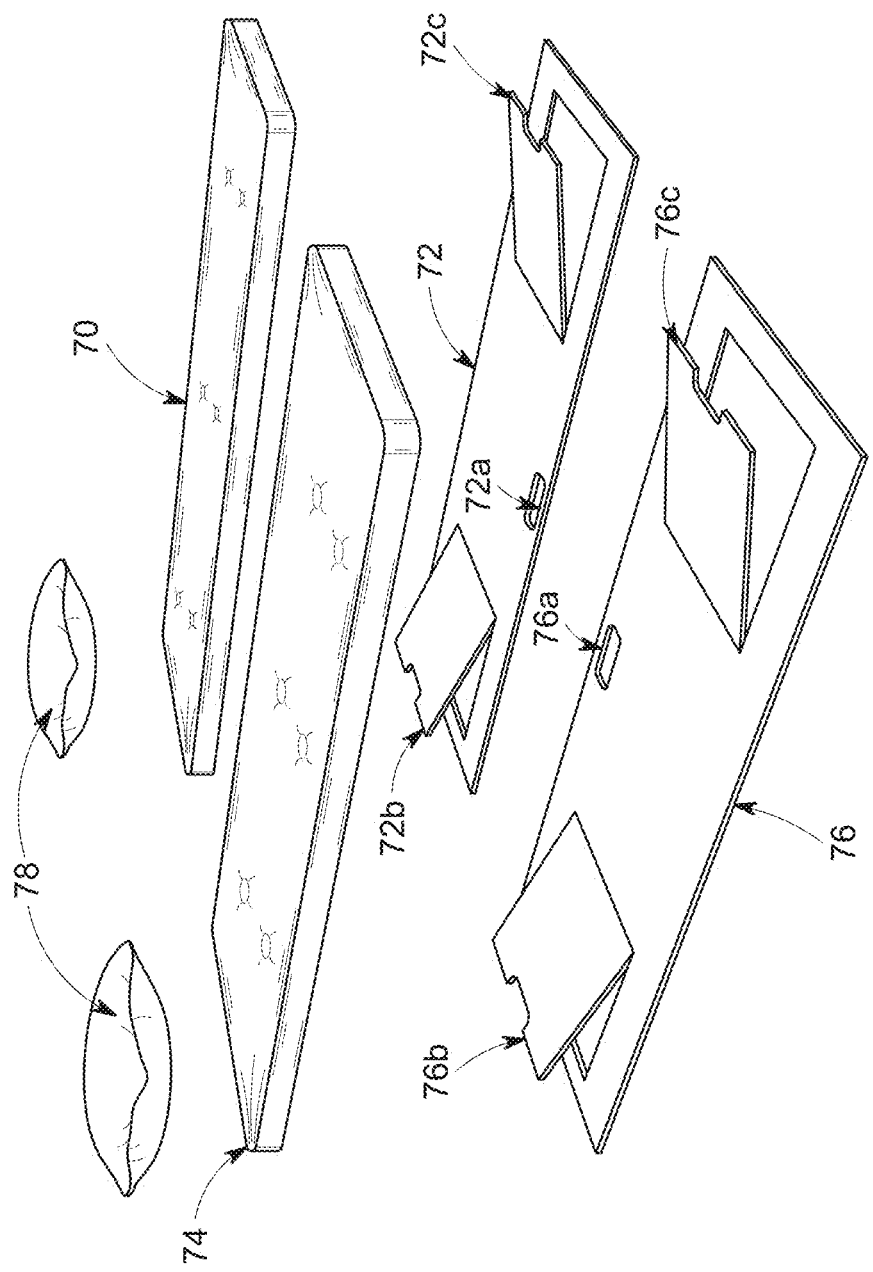
FIG. 16 shows exemplary mattresses and mattress platforms.

FIG. 16 shows an exploded view of an exemplary bed system comprised by a pair of mattress sections 70 and 74 and the mattress platforms 72 and 76 that support them that may be contained in camper 1. The mattress sections, mattress platforms, and other any bedding such as pillows 78, may be stored in the lids of camper 1 and repositioned for use. The mattress platforms may be made of any rigid or supportive material, such as metal, wood, plastic, or some composite material, or any combination of material capable of supporting the weight of a person. Mattress platforms 72 and 76 may each contain handles 72a and 76a, respectively, to allow a person to grab them so that they may be repositioned for use, as explained below. When positioned for use, there may be space under the mattress platforms 72 and 76, such that items may be stored below them. Mattress platform 72 may contain hatches 72b and 72c that may allow access to the storage area below, and mattress 76 may contain hatches 76b and 76c to allow access to the storage area below, when each is positioned for use.

Figure 17:
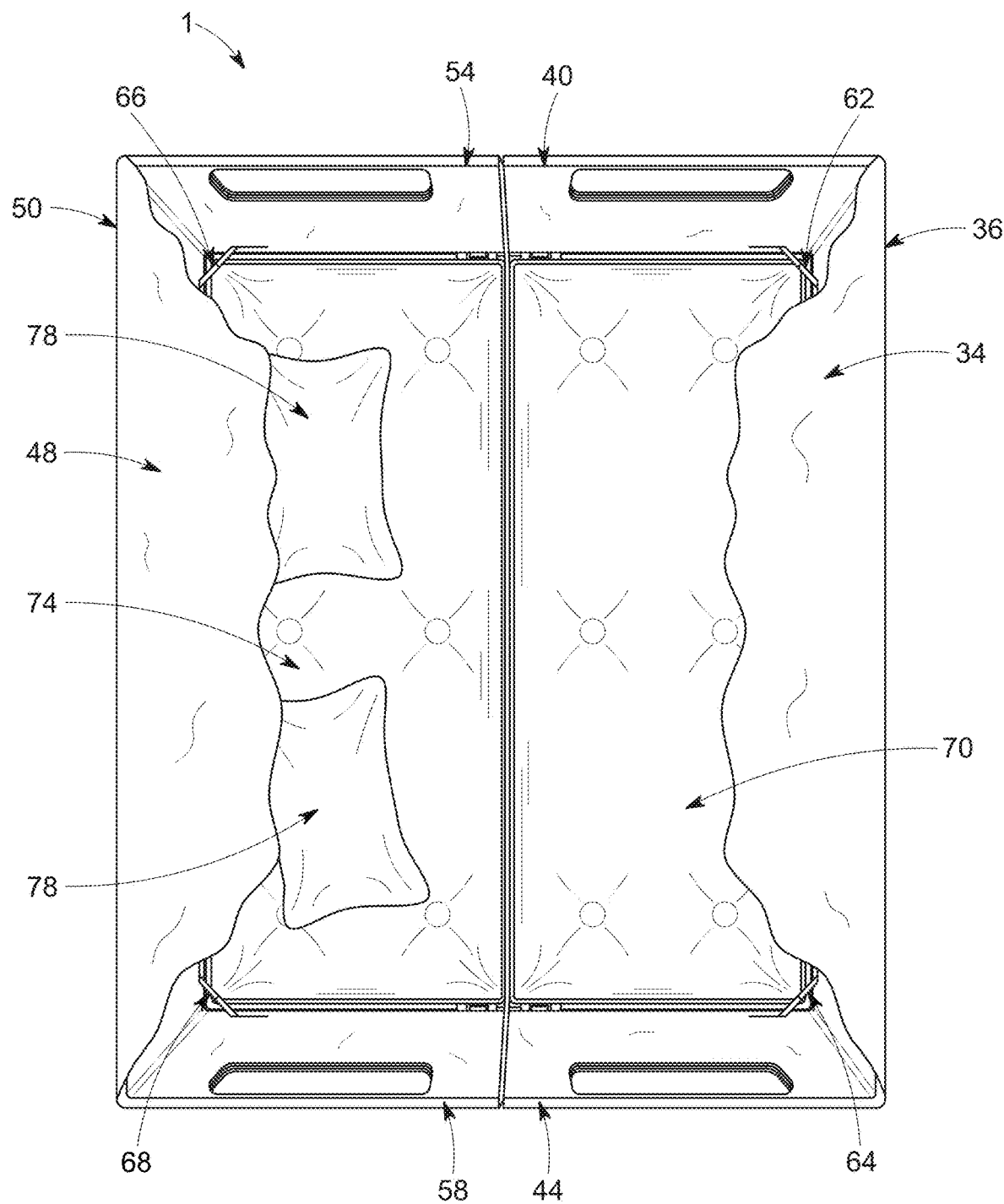
FIG. 17 shows a top, perspective view of interior of the camper of FIG. 14 with mattress sections and pillows in a stored position.
Figure 18:
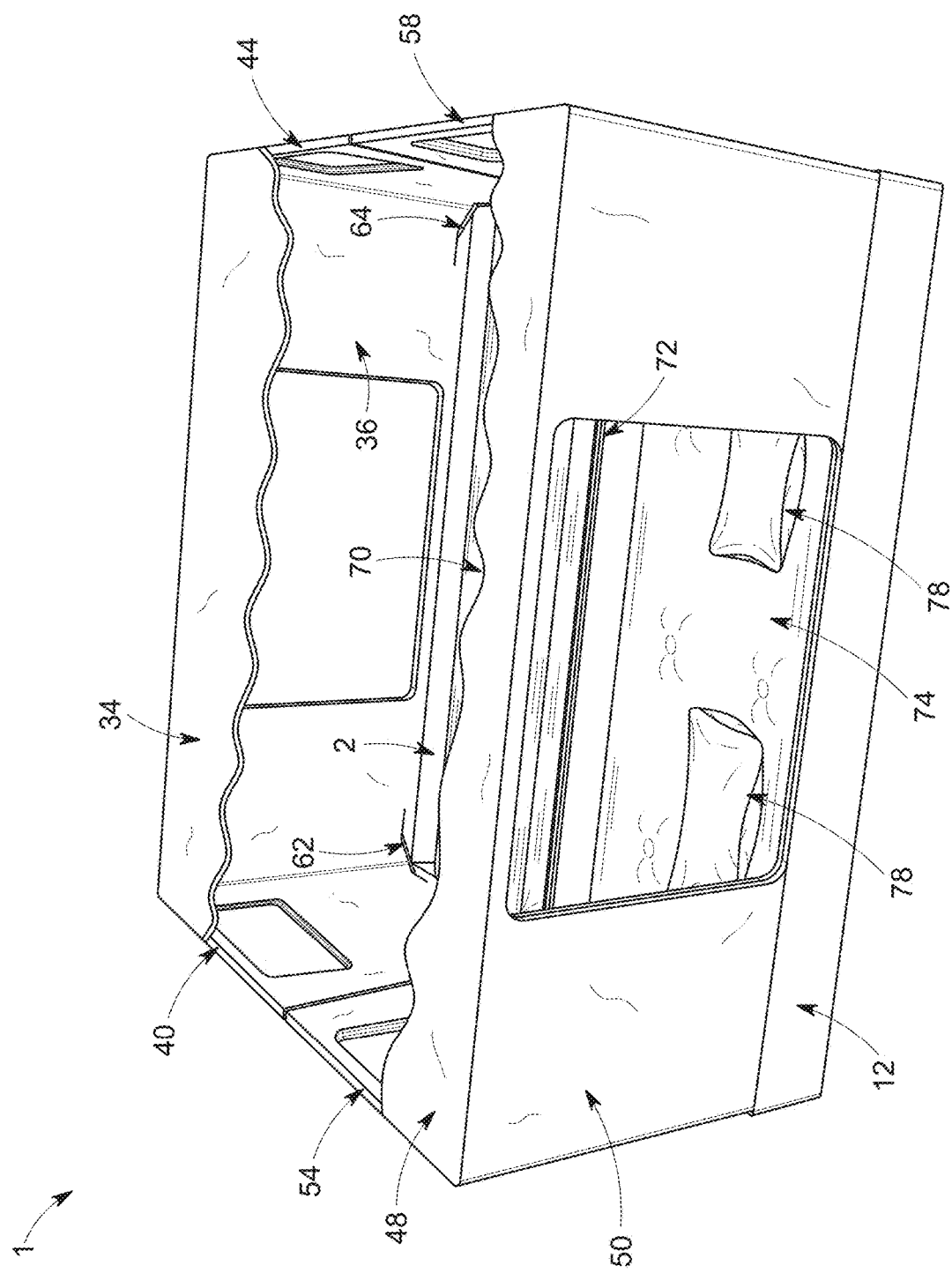
FIG. 18 shows a mattress section and mattress platform of the camper in FIG. 14 being moved into position for use.
Figure 19:
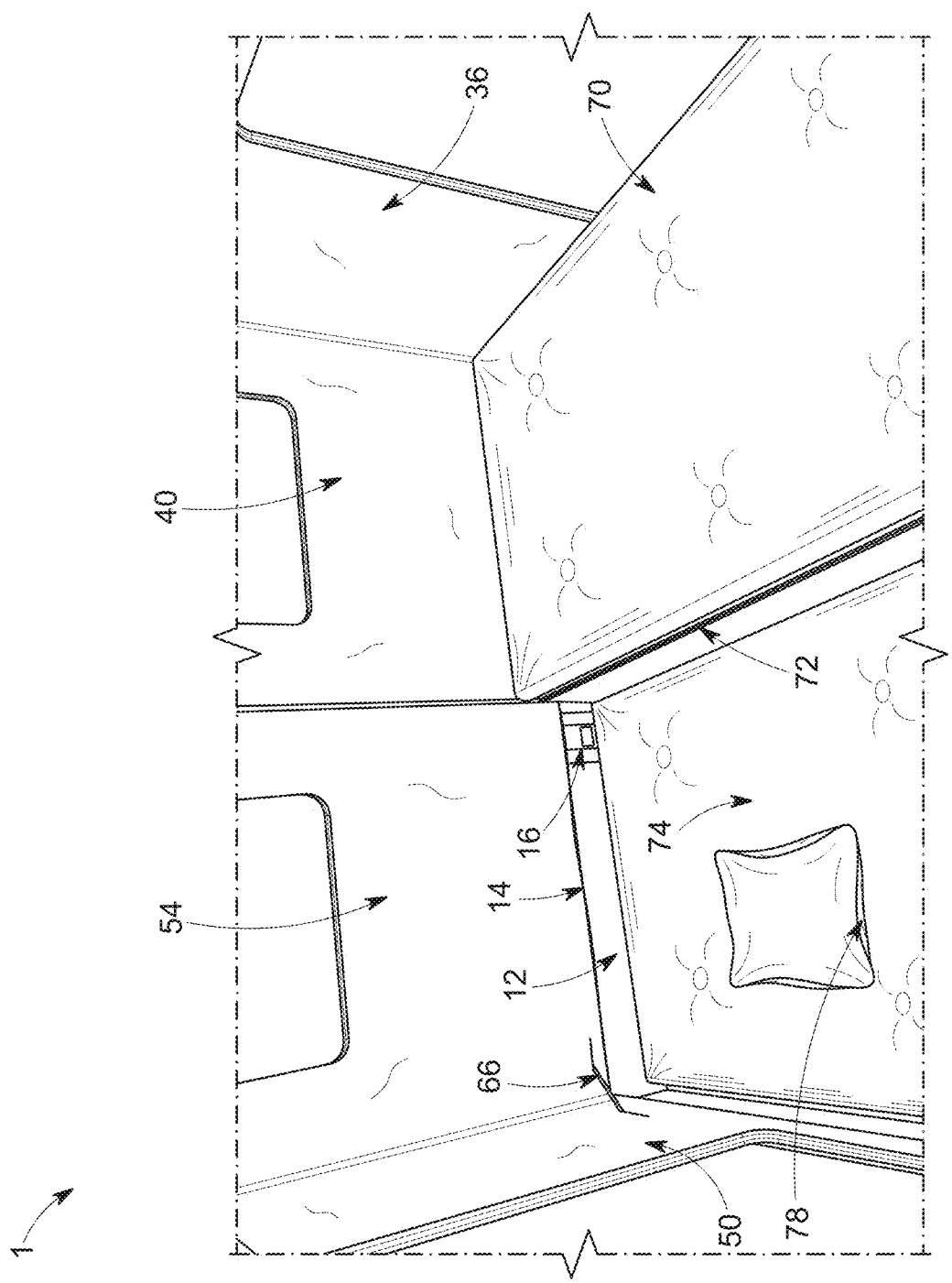
FIG. 19 shows an interior perspective view of a mattress section in position for use, while another mattress section is still in stored position.
Figure 20:
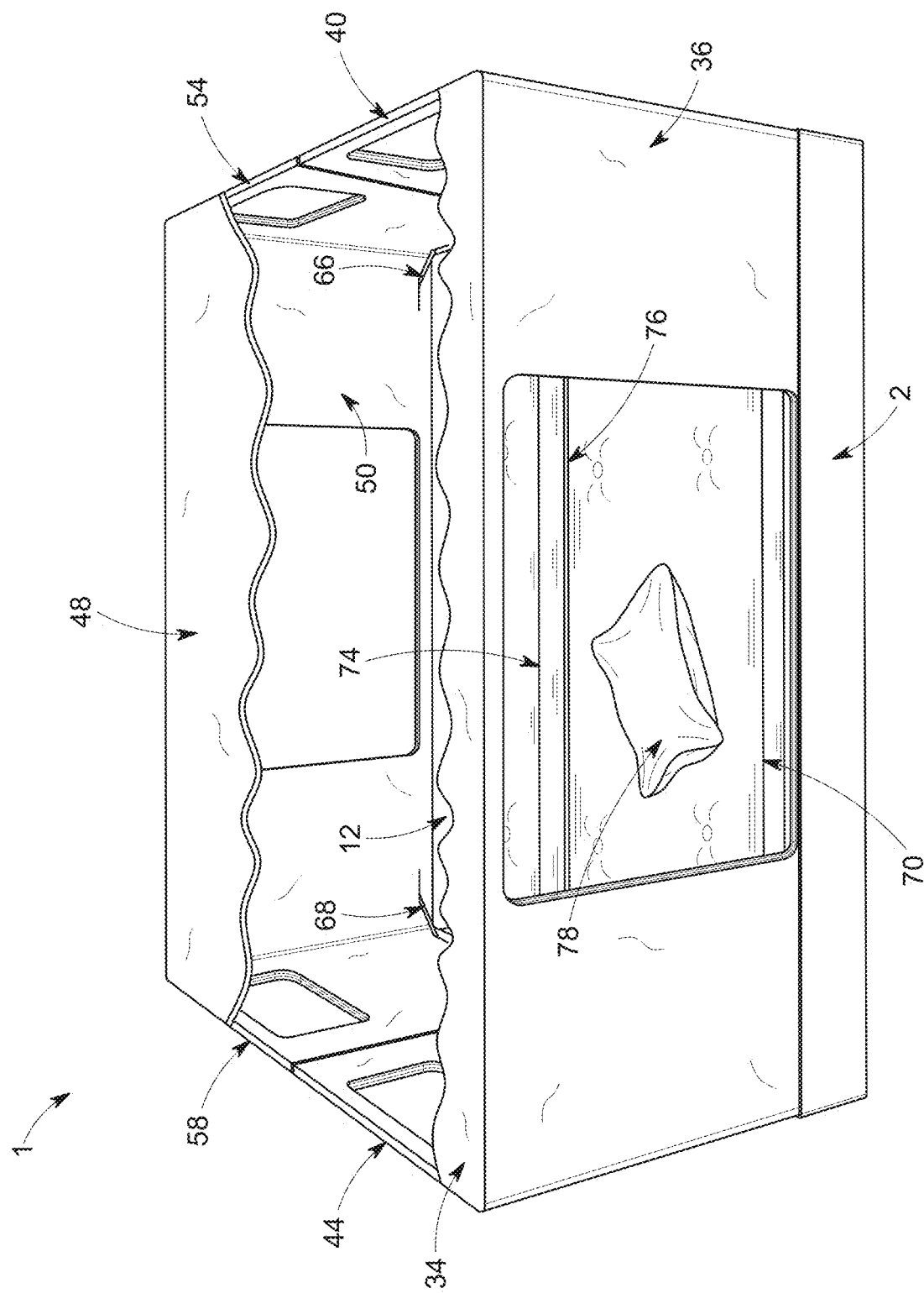
FIG. 20 shows an interior perspective view of a second mattress section being moved into position for use.
Figure 21:
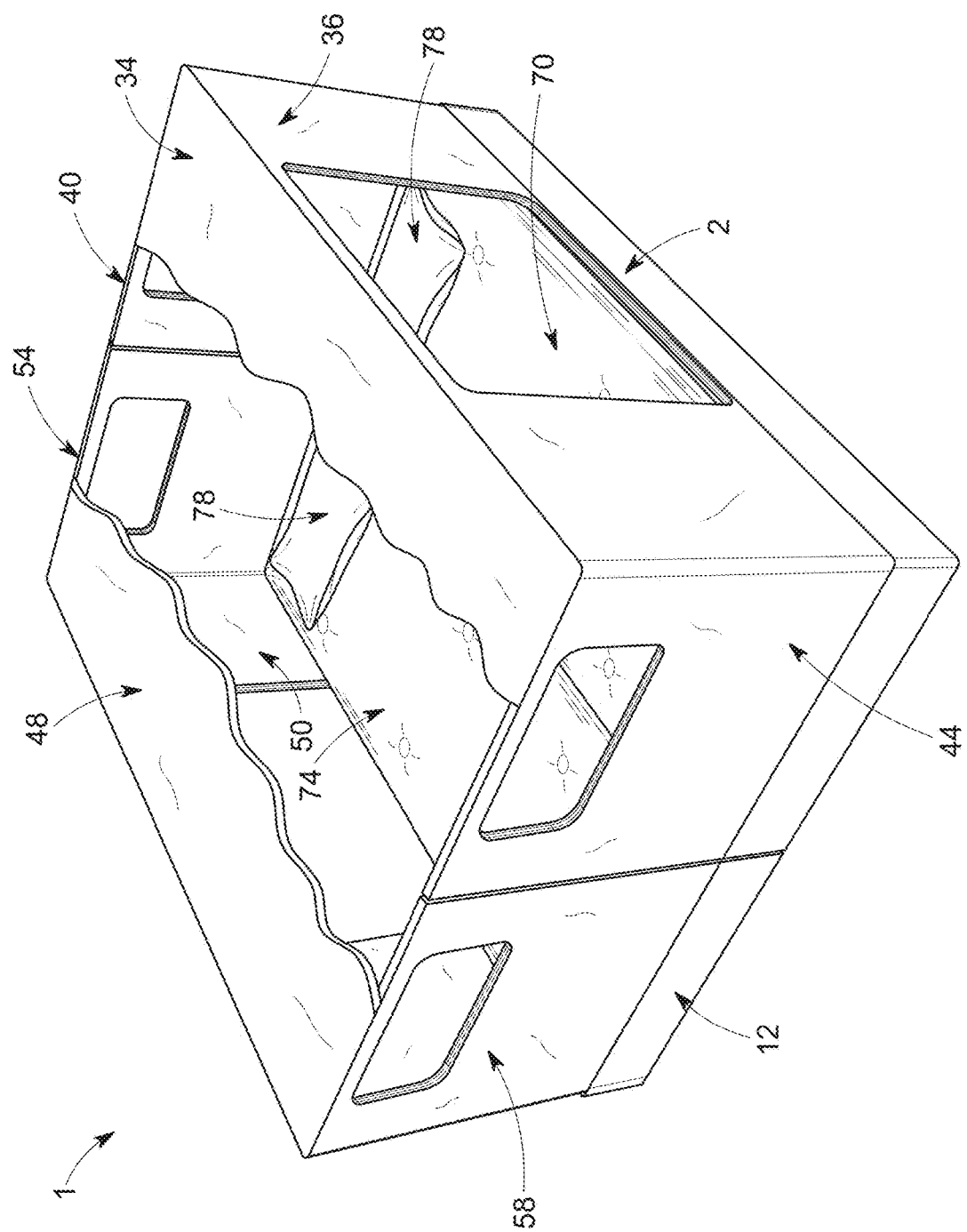
FIG. 21 shows an interior perspective view of two mattress sections in position for use as a bed.

With rigid roof panels 34 and 48; rigid side panels 36 and 50; rigid end panels sections 40, 44, 54, and 58 fully raised, unfolded, repositioned, or otherwise moved into position and secured for use, as shown in FIGS. 14 and 15, mattress section 70 with mattress platform 72, and mattress section 74 with mattress platform 76, may be repositioned for use, if necessary. Mattress sections 70 and 74, mattress platforms 72 and 76 below the mattress sections, pillows 78, and any other bedding or other components stored on the mattresses may now be moved from their stored positions in the floor, between the center joint formed by the top and bottom lids and under corner hinges 62-68, as shown in FIG. 17. Corner hinges 62-68 may also be used to reposition the mattress sections and their platforms above the center joint formed by the two open lids, to allow for a larger bed with no division between. As shown in FIG. 18, mattress section 70 with mattress platform 72 may be pulled out using handle 72*a* (mattress platform 72 and handle 72*a* were previously shown in FIG. 16) from under corner hinges 62 and 64, which join end panel sections 40 and 44, respectively, with side panel 36. As shown in FIG. 19, mattress section 70 and mattress platform 72 may be positioned to rest on or over the center joint between top lid 2 (not visible in FIG. 19) and bottom lid 12 on one side and on or over corner hinges 62 and 64 (neither of which is visible in FIG. 19) connecting end panels 40 and 44 (not visible in FIG. 19), respectively, with side panel 36 on the other side. By repositioning the mattress in this manner, some parts of the internal frame latch and internal frame, if either is present, corner hinges, and some of the other hinges on that side may be concealed below mattress platform 72, offering better aesthetics and a more comfortable interior. As also shown in FIG. 19, some of these components are still visible above mattress section 74, while it is still in its stored position. As shown in FIG. 20, the same action may be performed on mattress section 74 and mattress platform 76 as was done with mattress section 70 and mattress platform 72. First, any items stored on mattress section 74 while it is still in its stored position, like pillows 78, may be moved onto the other mattress, mattress section 70, or moved out of the way, or removed. Then mattress section 74 along with mattress platform 76 may be pulled out using handle 76*a* (mattress platform 76 and handle 76*a* were previously shown in FIG. 16) from its stored position in bottom lid 12 and under the two corner hinges 66 and 68, connecting end panels 54 and 58, respectively, to side panel 50, as shown. It is noted that in FIG. 20, mattress section 74 is pulled up from its stored position at an angle and in such a way that it would temporarily be slightly raised above mattress section 70 until it is positioned onto corner hinges 66 and 68 to lay side-by-side with mattress section 70. As shown in FIG. 21, mattress 74 and mattress platform 76 may be positioned on or over corner hinges 66 and 68 (neither of which is visible in this image), connecting end panels 54 and 58, respectively, to side panel 50 on one side and on or over the center joint between bottom lid 12 and top lid 2 on the other side. This placement may position both mattress sections 70 and 74 adjacent to each other to form a larger, more comfortable bed, with no divider in between, as mentioned previously. Storage may also now exist beneath the repositioned mattress platforms 72 and 76, which may be accessed through hatches 72*b*, 72*c*, 76*b*, and 76*c* as explained above and shown previously in FIG. 16. Positioning the mattress higher may also aid in entering and exiting camper 1, since the mattress can be positioned at or above the bottom of the door frames in side panels 36 and 50, as shown in FIG. 21. If camper 1 is stored on a vehicle roof or other high position that requires a ladder to access the interior of camper 1 or exit it, the elevated mattress position may allow a person to crawl directly onto or off the mattress, for a more comfortable ingress and egress, rather than having to crawl over the door frame. When mattress platforms 72 and 76 are positioned for use between the rigid wall panels of camper 1, they will add increased structural rigidity to an expanded camper 1, further preventing unwanted movement of the wall panels erected around them.

Hinges and latches connecting the rigid panels of camper 1 to their adjacent panels and/or panel sections and/or top and bottom lids, as well as the perimeter of the top and bottom lids surrounding the erected panel walls, as well as the rigid mattress platforms moved into place between the camper walls and over the joint between the lids may give camper 1 the structural rigidity to allow occupants to comfortably lean against the interior walls and may prevent unwanted movement, folding, unfolding, opening, or closing of the panel walls by accident, or by persons or animals outside the camper. Panel doors 38 and 52 may each contain locks that may allow camper 1 to be secured from outside and/or inside. Panel windows 42, 46, 56, and 60 may also each contain locks to prevent unwanted opening from outside. Camper 1, once expanded and locked, may be as (or more) secure compared with existing hard-sided campers, although it may be capable of packing down into a substantially more compact case for transport.

Figure 22:
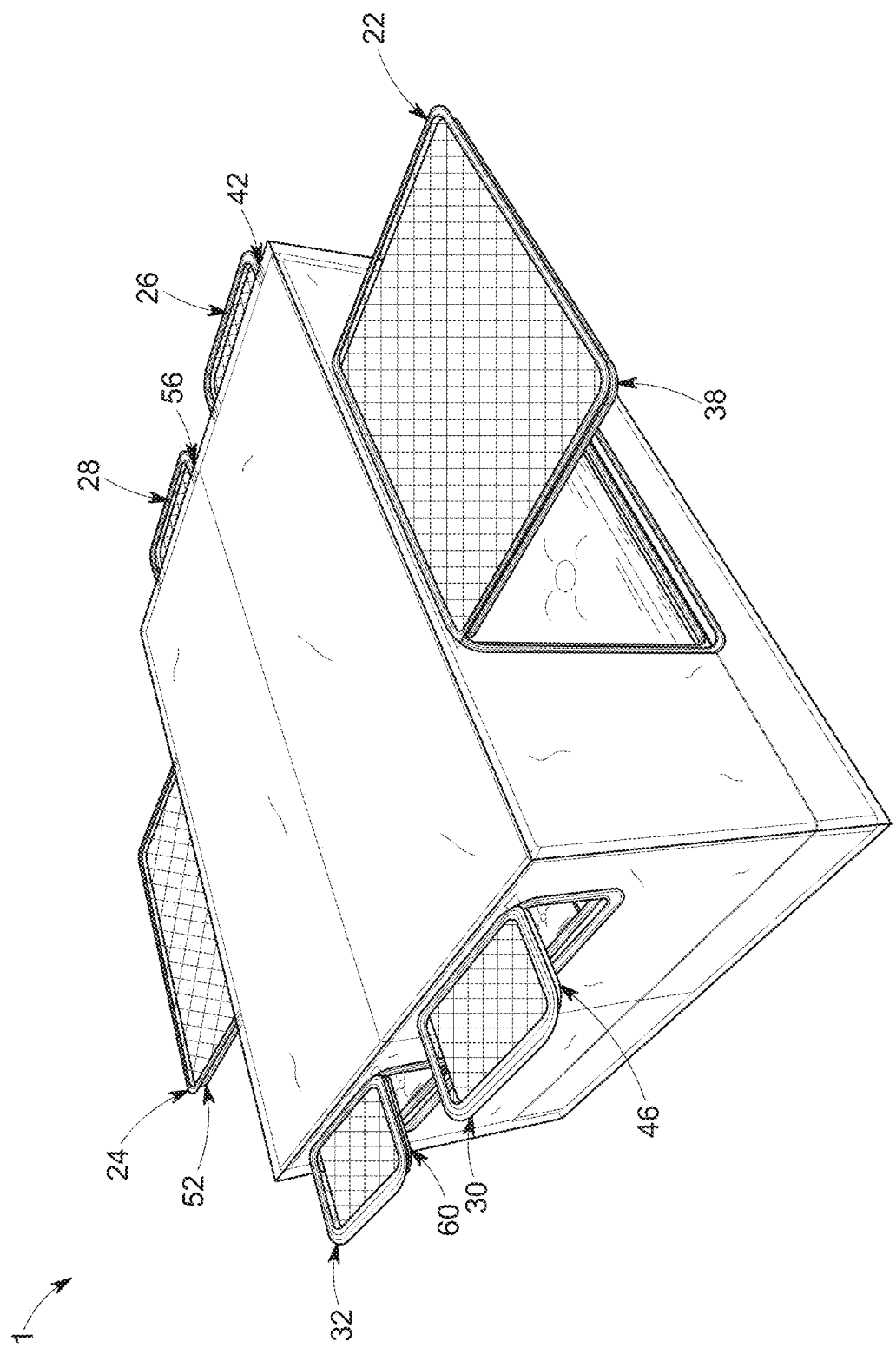
FIG. 22 shows the camper in FIG. 14 with panel doors and windows, and tent doors and windows open.
Figure 23:
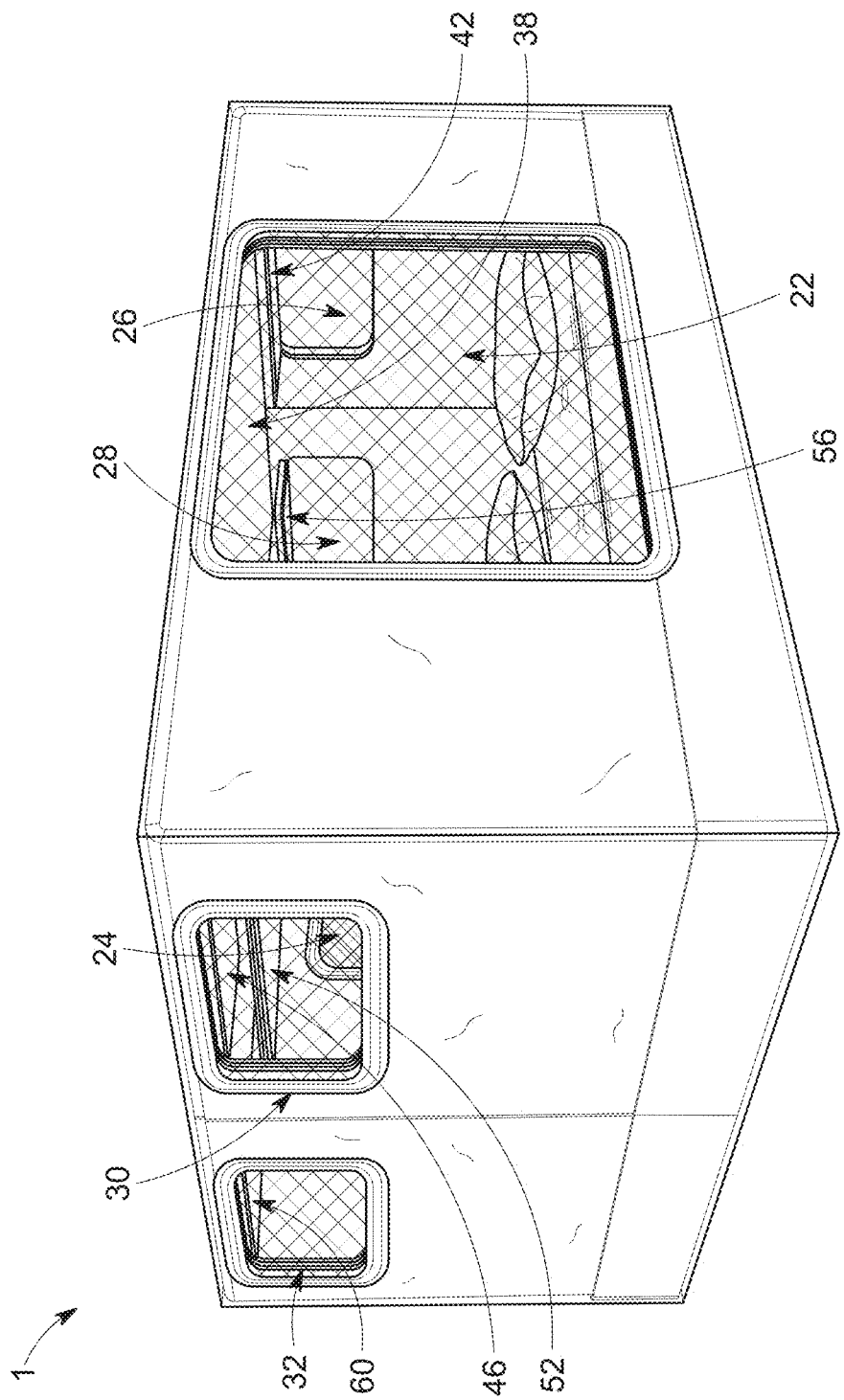
FIG. 23 shows the camper in FIG. 14 with just panel doors and panel windows open.

The rigid panel doors and windows that align with the tent doors and windows may be opened together to provide unobstructed openings in camper 1. Two-way hinges connecting panel doors and windows to panel sections, may allow rigid panel doors and rigid panel windows to open in either direction, outward or inward, and if those hinges are also torque or friction hinges, they may also allow the rigid panel doors and rigid panel windows to remain in position, without the need for any further support. Two-way friction or torque hinges such as these may be used for panel doors 38 and 52, and panel windows 42, 46, 56, and 60 of camper 1. Panel doors and windows may be opened slightly outward or inward so that a person may reach the zippers (or hook and loop fasteners, snaps, magnets or other mechanism) of the tent doors and windows and/or their insect screens, so that they may either be opened or closed. FIG. 22 shows how panel doors and windows may align with tent doors and windows, so that they may be opened together, like panel 38 with tent door 22, panel door 52 with tent door 24, panel window 42 with tent window 26, panel window 46 with tent window 30, panel window 56 with tent window 28, and panel window 60 with tent window 32. The action of the friction (or torque) hinge may allow the panel doors and windows to also keep the tent doors and windows in open position, as they rest on the panel doors and windows. The insect screen portions of the tent doors and windows may also remain closed while the window portion of the tent doors and windows may remain open, similar to the function of a typical tent door and window. Along with open panel doors and panel windows, this may allow air to flow more freely into and out of camper 1, while keeping insects out. The panel doors and windows may be opened outward slightly, slightly pushing outward on the closed tent door and window screens to allow some free-flow of air and may be beneficial if there is rain, so that the panel doors and windows may provide some shelter from failing rain. Or the panel doors and windows may be fully opened inward while the tent door and window screens remain closed, allowing much more free-flow of air, as shown in FIG. 23. Depending on the position of the mattress and mattress platforms, it may be necessary to temporarily move them to open panel doors 38 and 52 substantially inward, then return them to their positions. Alternatively, it may be possible to have insect screens in the tent doors and windows that have a substantial amount of slack such that they form a net around the panel door and window openings when they're opened outward fully or substantially.

The rigid panels of camper 1 (e.g., roof panels, side wall panels, end wall panels, panel doors, and panel windows) may be constructed of any rigid material, such as polycarbonate, acrylic, or other plastic; aluminum or other metal;

wood; composite material such as fiberglass or carbon fiber; or some combination of rigid and/or soft materials. The rigid panels of camper 1 may transparent or opaque or may be some combination of transparent and opaque panels. The rigid panels of camper may be solid, porous, perforated, or may contain small or large gaps, openings, or holes. It may be beneficial to choose a rigid panel material for some or all panels of camper 1 that reduces weight, increases strength, and/or is easier to manufacture or assemble. Various panel materials have various properties and benefits, and the advantage of having a rigid panel frame under a tent cover is that there may be a greater choice of panel material and the hinges, latches, and/or locks used to construct them, since the materials used may not need to be water-resistant, waterproof, or insect proof, and no sealing between panel joints, gaps, or holes may be necessary. The rigid panel material may be left bare or may be covered with upholstery on one or both sides. To achieve greater comfort inside, for example, it may be beneficial to have upholstered walls. Fabric may be attached directly to the rigid panel surfaces on one or both sides. Alternatively, a fabric sleeve may be slipped over the rigid panels. This may offer several advantages: it may provide a better aesthetic and greater comfort inside (e.g., plush upholstered interior walls); it may add additional insulation to the rigid panels on one or both sides (e.g., the sleeves themselves may have insulation in them); use of reversible fabric with a heat reflective material on one side and a normal or heat absorbing material on the other side may aid in the heating and/or cooling of the camper; a 2-sided sleeve may offer a different choice of material for the interior facing sides of the walls and another choice for the exterior facing side of the walls; portions of the sleeve may serve as shades, and may be pulled back to allow sunlight to come through and/or to see outside, if the rigid panels under them are clear or see-through; the sleeve may be easily removed entirely, if desired, for washing or so that the rigid panels alone may be used (e.g., if the rigid panels are clear, and the sleeves are removed entirely or pulled back substantially on the roof, side, ends, door, and window panels, a person may have a substantially unobstructed view of the natural surroundings, while still remaining sheltered inside the camper); use of a sleeve may reduce manufacturing and assembly cost, complexity, and weight of the panels without the need for fasteners and/or adhesive or require fewer fasteners or adhesive; and a panel sleeve may be sufficiently large enough to envelope more than one rigid panel, panel section, and/or panel door or window, or fully assembled walls.

Figure 24:
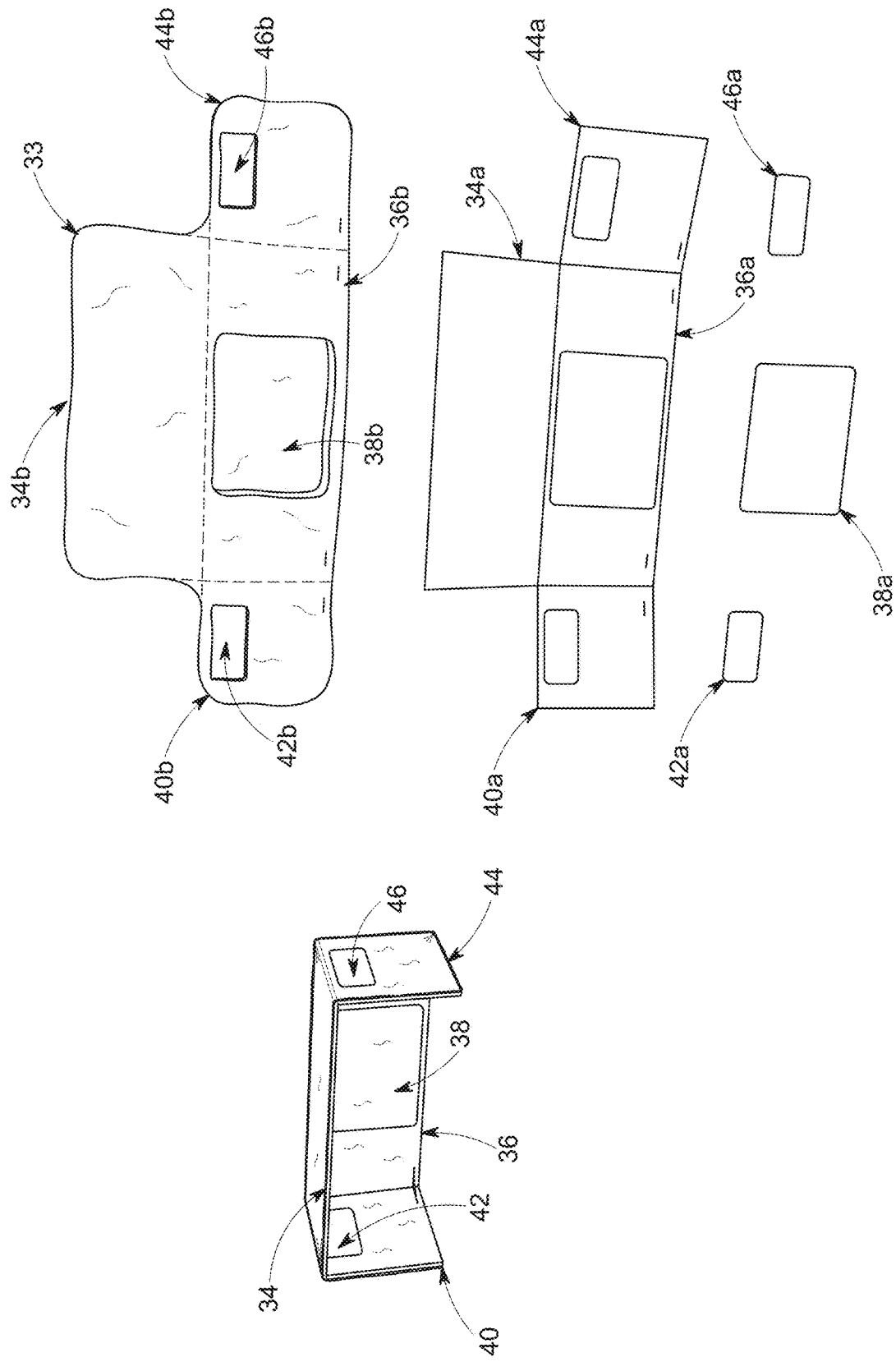
FIG. 24 shows components of an exemplary set of panels and panel sections.

In an exploded view of an exemplary set of rigid panels that make up one side of the walls and roof of camper 1, as shown in FIG. 24, panel sleeve 33 may be installed over the underlying rigid, structural panels of roof panel 34, side panel 36, panel door 38, end panel section 40, panel window 42, end panel section 44, and panel window 46. FIG. 24 shows detail of the components that make up the panels on one side of camper 1, which include the rigid, structural panels as well as portions of the fabric sleeve that may cover them. Each rigid, structural panel section may have a corresponding portion of the panel sleeve 33, which may serve as covers for the structural panels or may serve as shades for windows or see-through doors. For example, as shown in FIG. 24, roof panel 34 may be comprised of structural roof panel 34a covered by roof sleeve portion 34b; side panel 36 may be comprised of structural side panel 36a covered by side sleeve portion 36b; panel door 38 may be comprised of structural door panel 38a covered by door sleeve portion 38b; end panel section 40 may be comprised of structural end panel 40a covered by end sleeve portion 40b; panel window 42 may be comprised of structural window panel 42a covered by window shade 42b; end panel section 44 may be comprised of structural end panel 44a covered by end sleeve portion 44b; and panel window 46 may be comprised of structural window panel 46a covered by window shade 46b. Panel sleeve 33 may be a fabric sleeve comprised of sleeve portions 34b, 36b, 40b, 44b and shades 38b, 42b, and 46b, as shown in FIG. 24. Panel sleeve 33 may be one continuous piece, such that during installation or assembly, it may slide over structural roof panel 34a, structural side panel 36a, and structural end panel sections 40a and 44a, even if they may already be assembled and hinged together. Structural door panel 38a and structural window panels 42a and 46a may then slide into the corresponding portion of panel sleeve 33 that may cover the structural door and window panels, as shown in FIG. 24, and the structural door and window panels may next be attached (e.g., using screws and/or by other means of connecting their hinges or connecting them to hinges already on the panel walls) to their respective panel sections for installation. Or the rigid, structural door and window panels may be detached and slid out of their respective portions of panel sleeve 33, and panel sleeve 33 may be slid off structural roof panel 34a, structural side panel 36a, and structural end panels 40a and 44a for removal. Panel sleeve 33 may be open or openable on one or more ends to allow for easy installation and/or removal, possibly without the need to separate the structural panels and/or separate the structural door and window panels from the structural panels they are attached to, prior to installation or removal of panel sleeve 33. Any openable ends may be easily closed after installation around the rigid panels or may be opened prior to removal, by use of hook and loop fasteners, zippers, snaps, magnets or other means of easily joining or opening fabric sections. Some ends of panel sleeve 33, where it may be beneficial to remain open for ease of manufacture and assembly, installation and/or removal, or for use as a shade, may contain elastic to allow the sleeve or that portion of it to fit snugly around the structural panel it covers or be pulled off it. The panels described above, may be used on one side of camper 1.

Figure 25:
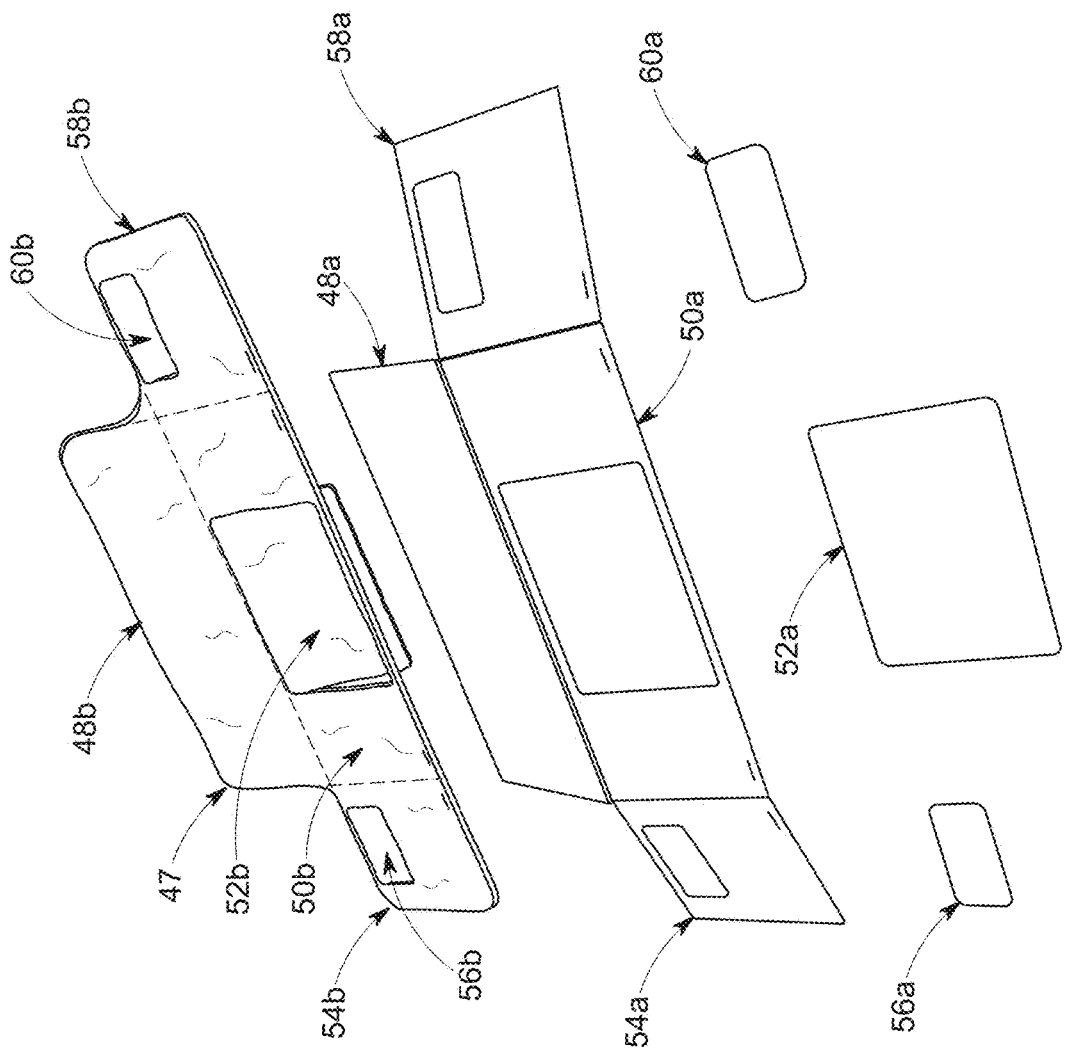
FIG. 25 shows components of another exemplary set of panels and panel sections.
Figure 25:
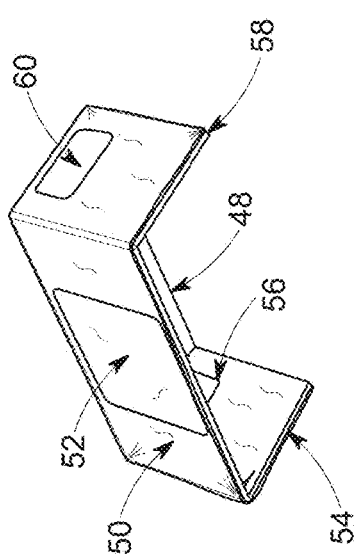

A second set of panels, either identical to the first set, or a mirror image of the first set, may be used on the other side of camper 1. The second set of panels may be comprised of structural panels covered by a fabric panel sleeve or portions of a fabric panel sleeve. An exploded view of the walls and roof of another side of camper 1 is shown in FIG. 25. As shown, roof panel 48 may be comprised of structural roof panel 48a covered by roof sleeve portion 48b contained in panel sleeve 47, side panel 50 may be comprised of structural side panel 50a covered by side sleeve portion 50b contained in panel sleeve 47, panel door 52 may be comprised of structural door panel 52a covered by door sleeve portion 52b contained in panel sleeve 47, end panel section 54 may be comprised of structural end panel 54a covered by end sleeve portion 54b contained in panel sleeve 47, panel window 56 may be comprised of structural window panel 56a covered by window shade 56b contained in panel sleeve 47, end panel section 58 may be comprised of structural end panel 58a covered by end sleeve portion 58b contained in panel sleeve 47, and panel window 60 may be comprised of structural window panel 60a covered by window shade 60b contained in panel sleeve 47.

Figure 26:
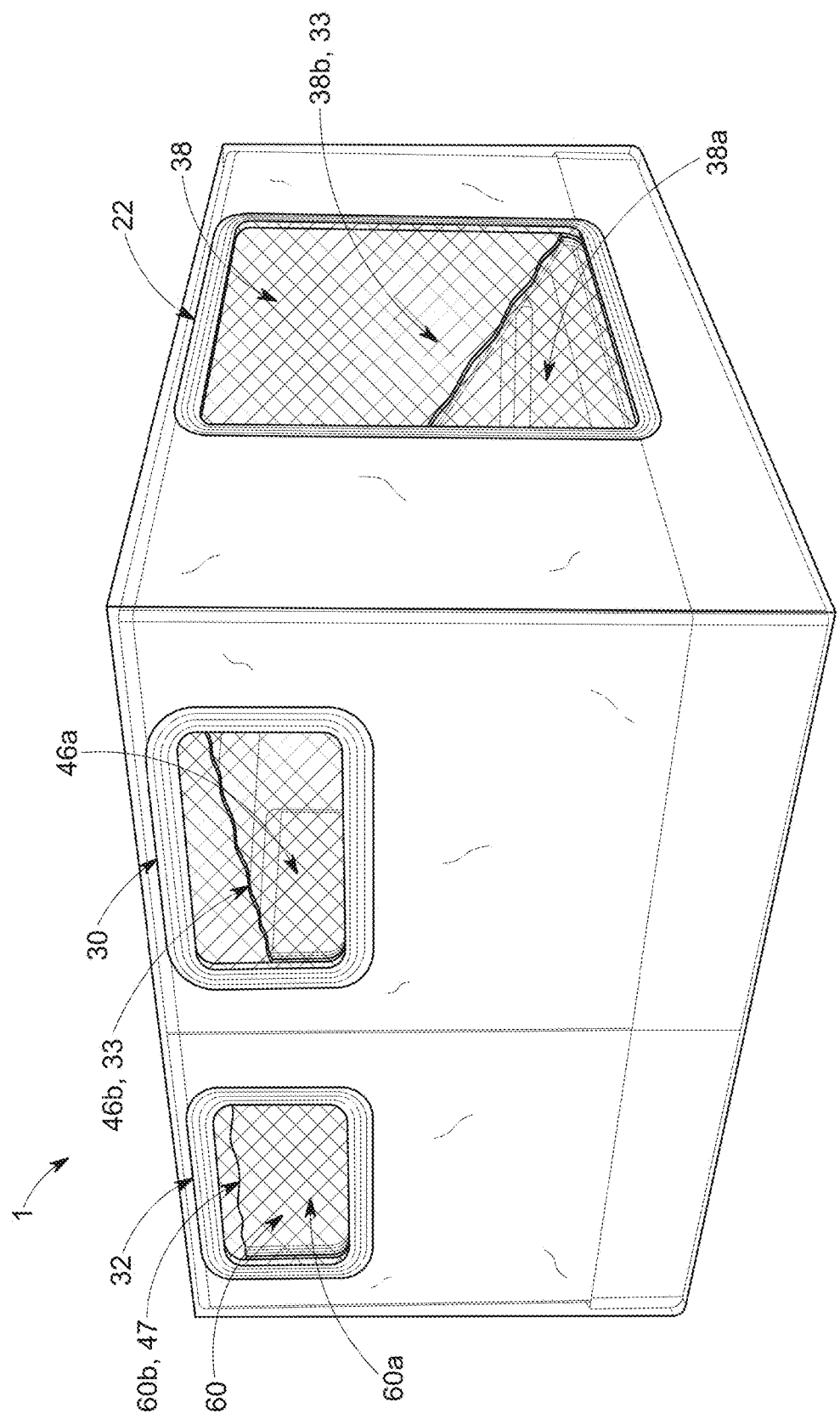
FIG. 26 shows the camper of FIG. 14 with the shades pulled up on the doors and windows.

FIG. 26 shows some of the shades, sleeve portion 38b and window shade 46b, of panel sleeve 33, in transition of being pulled up to uncover transparent structural door panel 38a of panel door 38 and structural window panel 46a of panel window 46, respectively. A portion of sleeve 47, window shade 60b, covering structural window panel 60a of panel window 60 is also shown, pulled up fully or almost fully, in FIG. 26. Similarly, other portions of sleeves 33 and 47 covering transparent structural door, window, roof, and/or wall panels or panel sections may be partially, substantially, or fully lifted, pulled back, removed, or otherwise repositioned.

The methods for closing and packing the camper, may be the reverse of the steps and methods outlined previously. For example, the bed system, which includes the mattress sections, mattress platforms, and any bedding may be repositioned for storage in the top and bottom lids. Roof and wall panels or panel sections along with the door and window panels attached to them may be unlocked, unlatched, or detached from the panels or panel sections that they are were attached to in order to expand camper 1. Panels and panel sections may then be folded, moved, or otherwise repositioned for storage, in the reverse order of the steps outlined previously, or in another order, or simultaneously. Once all of the panels are folded flat for storage, the tent will come down over the folded panels, and the bottom tent seam may be pulled up so that it may further constrain items in the top and bottom lids for closing. Any additional strapping if present, may be latched, and the top lid may be folded over to close over the bottom lid. The case may then be latched closed, and locked, if desired.

Figure 27:
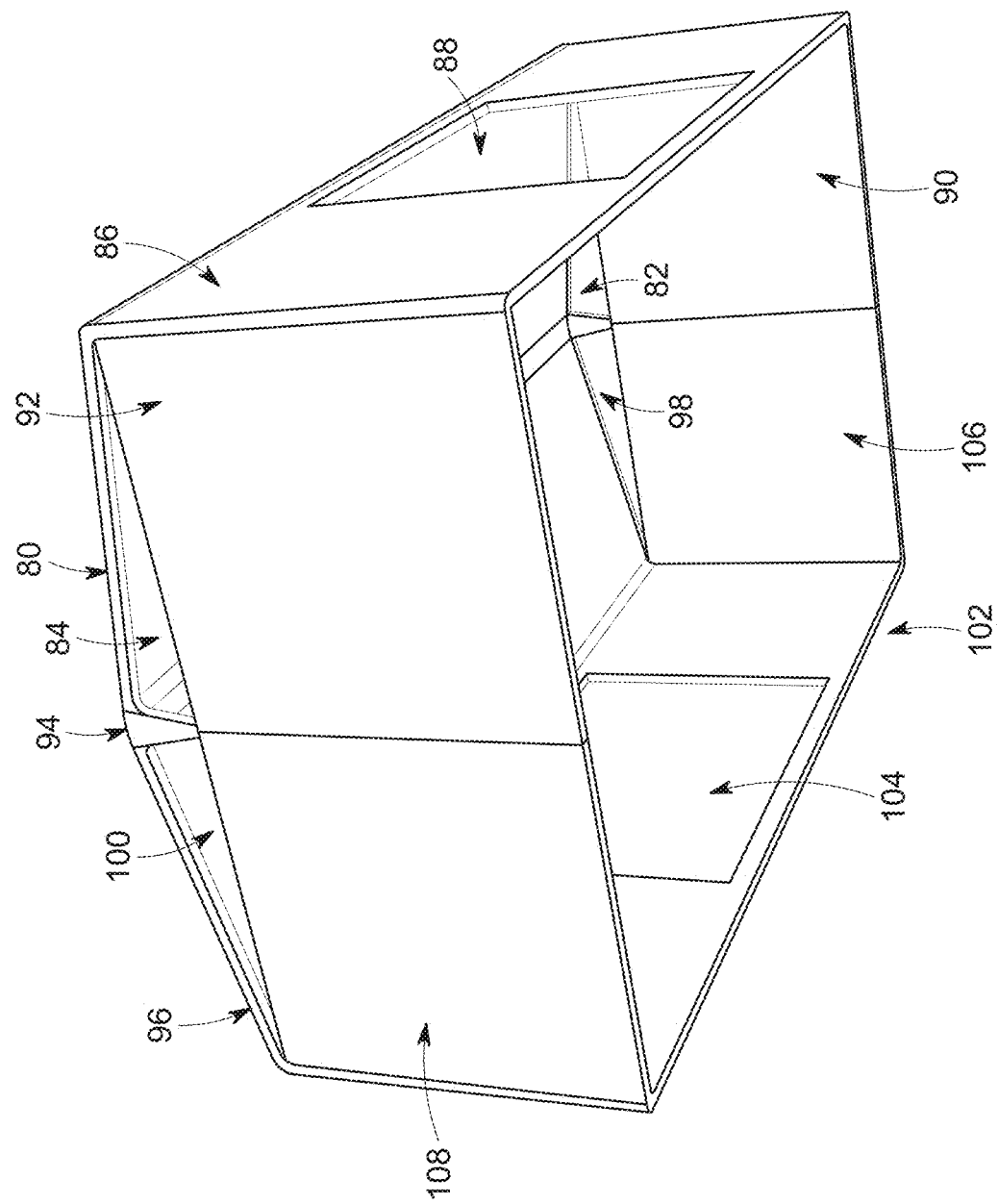
FIG. 27 shows another exemplary set of rigid panels that may be used to form a pitched roof.

FIG. 27 shows another exemplary set of rigid panels that may be used in a camper or shelter to form a pitched roof, when expanded for use. These panels may be the same as or similar to the panels used to form a horizontal roof in an expanded camper or shelter, as described above, except that the roof panels may be sloped at an angle (e.g., greater than 90 to less than 180 degrees) relative to the side panels. The roof panels together may form an "A" shape to allow water (e.g., rainwater) to run off the roof and may also create additional headroom or height inside the camper, when it is expanded for use. A greater angle between the roof panels and the side panels may create a steeper roof for better water runoff and more interior headroom. Sloping the roof panels may create a gap between end panel sections and the roof panels and/or between roof panels, which may or may not need to be filled to maintain a substantially rigid and secure shelter, depending on the size of the gap. For example, roof panels pitched at a small angle (e.g., slightly greater than 90 degrees) relative to the side wall panels may create only small gaps between the end walls and the roof and in the middle of the roof that may not be large enough for a person to put their arm through or for an animal to get through, in which case it may not need to be filled with additional panels, yet may still provide the strength and security of a rigid shelter with a horizontal roof and no gap, when expanded, as described previously. If the gap is not filled with additional panels, the roof panels may be propped up over the end panel sections to form the pitched roof by use of small brackets, pins, or some other small components. If, however, the gap is large, or it is desirable to fill the gap, additional panels may be used, as shown in FIG. 27, to both allow the roof panels to sit an angle greater than 90 degrees relative to the side panels to form the pitched roof and to also fill the gap formed between the roof panels and the end panel sections. FIG. 27 shows roof panel 80 pitched at an angle greater than 90 degrees relative to side panel 86 which forms a gap between roof panel 80 and end panel sections 90 and 92 that may be filled by quarter panels 82 and 84, respectively. Similarly, as shown in FIG. 27, roof panel 96 may be pitched at an angle to side panel 102 that may be equivalent to the angle between roof panel 80 and side panel 86, which may form a gap between it and end panel sections 106 and 108 that may be filled by quarter panels 98 and 100, respectively. Additionally, any remaining gap that may still exist in the end walls and between the roof panels may be filled by mid-section 94, as also shown in FIG. 27.

The rigid panels used to form a pitched roof may have the same features and be comprised of the same or similar material used to create the rigid panels in a camper with a horizontal roof (when expanded for use), as previously described. For example, the rigid panels shown in FIG. 27 (e.g., roof panels, quarter panels, side panels, end panel sections, and door panels) may be constructed of any rigid material, such as polycarbonate, acrylic, or other plastic; aluminum or other metal; wood; composite material such as fiberglass or carbon fiber; or some combination of rigid and/or soft materials; and the panel material may be solid, porous, perforated, or mesh material. These rigid panels may also be covered with fabric sleeves similar to those previously described; and, as also previously described, the rigid panels may be a suitable structure to temporarily, semi-permanently, or permanently attach fixtures such as lighting, televisions, tablets or screens, ventilation fans, ventilation ports, or other suitable fixtures. In the example shown in FIG. 27, roof panels 80 and 96; side panels 86 and 102; and end panel sections 90, 92, 106, and 108 may be comprised of a solid material such as composite material or a sandwich panel comprised of various combinations of materials. In this case, with this construction, these rigid panels may not allow sunlight through or may not allow a person to view outside a shelter or camper fitted with them. FIG. 27 shows quarter panels 82, 84, 98, and 100; and panel doors 88 and 104 in side panels 86 and 102, respectively, comprised of a transparent material such as polycarbonate that may serve as windows for a camper or shelter with a pitched roof. Quarter panels 82 and 84 may be hingedly connected to roof panel 80, and quarter panels 98 and 100 may be hingedly connected to roof panel 96. Alternatively, the quarter panels may also be hingedly connected to the end panel sections. Mid-section 94 may be a portion of or connected to one of roof panels 80 or 96. For example, it may be hingedly connected to one roof panel and latched to the other roof panel when the shelter is expanded for use, to close the gap between roof panels. Alternatively, mid-section 94 may be a separate component that is not permanently connected to any panel and may be placed and attached in between panels, when the camper is expanded for use. Mid-section 94 may be comprised of a material similar to that of the rigid panels or may be comprised of a different material. For example, mid-section 94 may be a long, slender metal piece that can both serve as a gap filler between rigid panels as well as additional support for the roof panels. Mid-section 94 may contain lights on the inside (e.g., interior/dome lights and reading lights), power outlets, fans, batteries, provisions to connect to an external power source, ventilation ports for heating and cooling equipment, and/or other components.

Figure 28:
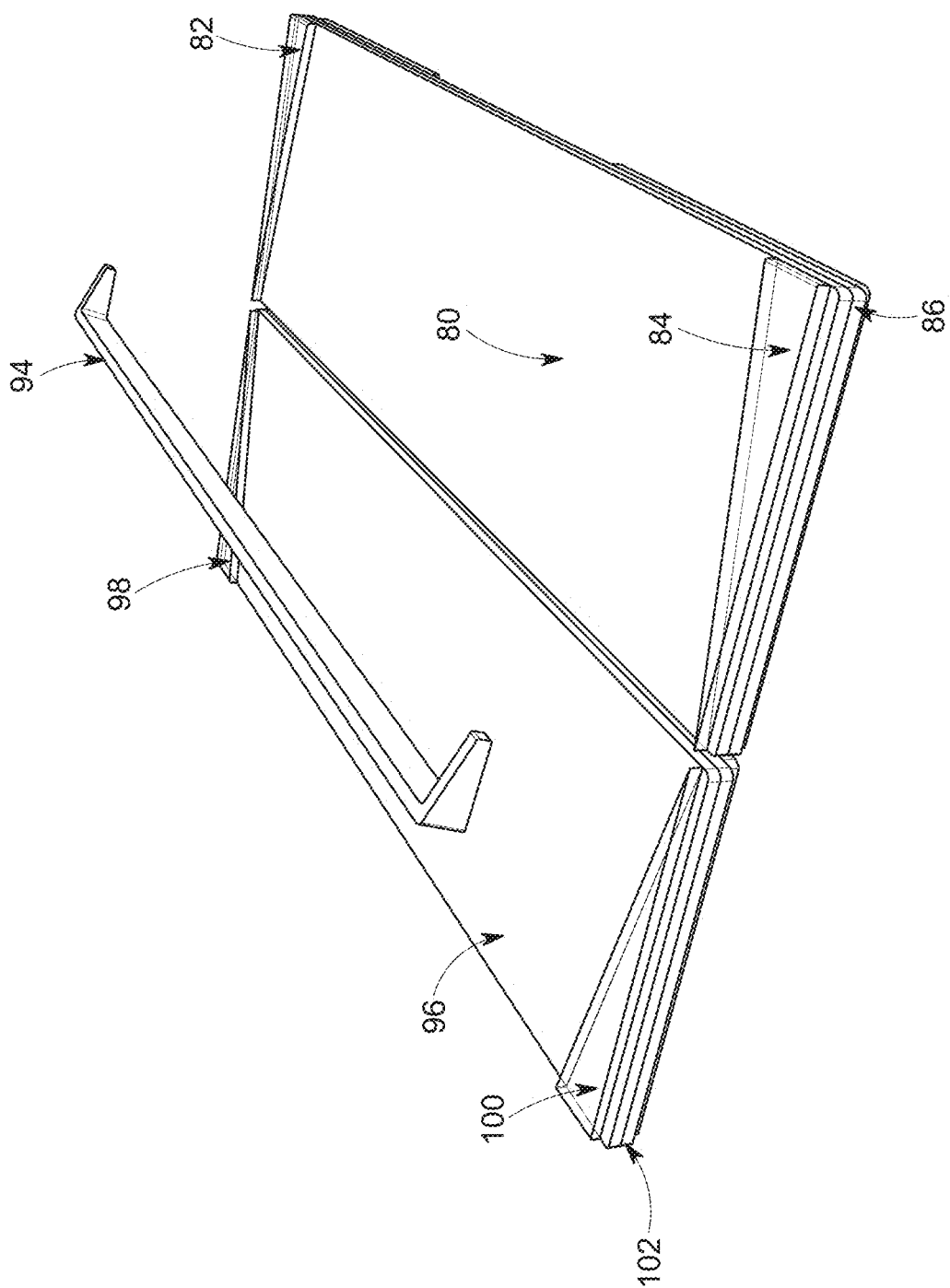
FIG. 28 shows the panels of FIG. 27 folded flat for storage.

The method of folding rigid panels for storage in a camper or shelter with a pitched roof can be the same as or similar to the method of folding rigid panels in a camper or shelter with a horizontal roof, as previously described, with the exception of the additional folding of the quarter panels and/or folding and/or removal of the mid-section, if either is present. As shown in FIG. 28, quarter panels 82 and 84 may be hingedly connected to the interior facing side (i.e., the side facing the interior of an expanded shelter) of roof panel 80. This attachment method may allow roof panel 80 to rotate at an angle (e.g., an angle starting at less than 270 degrees but greater than 180 degrees and ending at 0 degrees) relative to the exterior facing side of side panel 86, shown previously in FIG. 27, to which it is hinged, so that it may rest flat on top of side panel 86, as shown in FIG. 28, for collapsing of the shelter or camper. Quarter panels 82 and 84 may then (or simultaneously) fold inward along their hinges with roof panel 80 to rest flat against roof panel 80 and on top of the stack of rigid, folded panels, as shown in FIG. 28. The attachment and folding method of quarter panels 82 and 84 may allow the attachment and folding method of roof panel 80, side panel 86, end panel sections 90 and 92 to be the same as or similar to the attachment and folding methods of previously described roof panels, side panels, and end panel sections for campers or shelters with horizontal roofs. Similarly, quarter panels 98 and 100 may be hingedly connected to the interior facing side (i.e., the side of the panel facing the interior of an expanded shelter) of roof panel 96 such that when the wall and roof panels are folded flat for storage, quarter panels 98 and 100 may be flat against roof panel 96, which is on top of side panel 102, which is on top of the end panel sections, as shown in FIG. 28. As also shown in FIG. 28, mid-section 94 may be a separate component that may not be attached to any panel, in which case it may be loose and simply placed in the case for storage in any available space in either the top or bottom lids.

As shown in FIG. 29, the tent portion of a hybrid camper or shelter with a pitched roof may also have a different shape from the tent of hybrid shelter or camper with a horizontal roof, to accommodate the pitched roof line. As shown in FIG. 29, tent 110 follows the contours of the pitched roof line formed by the erected rigid panels, as previously shown in FIG. 27. Besides the shape and where window and door openings may be, if different, tent 110 may be the same as or similar to the tent described previously for a camper or shelter with a horizontal roof (when expanded for use). As FIG. 29 shows, to match the openings and/or windows of the rigid panels previously shown in FIG. 27, tent 110 may contain tent doors 112 and 114 that may align with panel doors 88 and 104, respectively, and may contain tent windows 116, 118, 120, and 122 that may align with quarter panels, 82, 84, 98, and 100, respectively.

As mentioned, the rigid wall and roof panels, quarter panels, mid-section, and tent shown in FIGS. 27-29, are another exemplary set of components that may form a hybrid camper or shelter with a pitched roof. The top and bottom lids of a shelter or camper with a pitched roof may need to be slightly deeper to accommodate the thickness of the extra quarter panels and/or mid-section, if at all necessary. All other components, methods, functions, and materials described previously for shelters or campers with a horizontal roof would still be contained in or pertain to a shelter or camper with a pitched roof.

The above apparatuses, devices, components, systems, assemblies, methods, etc. have generally been described as being applied to a portable shelter or camper and its components; however, the principles described may be applied to other types of shelters (e.g., a permanent, stationary, emergency, or medical shelter), apparatuses, devices, components, systems, assemblies, methods, etc. Further, the features described in one embodiment herein may generally be combined with features described in other embodiments herein.

While the apparatuses, devices, components, systems, assemblies, methods, etc. of this disclosure may have been described in terms of particular variations and illustrative figures, it will be apparent to those skilled in the art that the present disclosure is not so limited and that variations may be applied to other shelters, apparatuses, devices, components, systems, assemblies, methods, etc. For example, with respect to the methods, uses, and/or steps described herein variations may occur in the steps, uses, the sequence/order of steps, etc. described herein without departing from the concept, spirit, and scope of the present disclosure, as defined by the claims. Additionally, certain of the steps may be performed concurrently in a parallel process, when possible, as well as performed sequentially as described above. Likewise, the dimensions described herein may be viewed as illustrative of preferred embodiments but are not intended to limit the scope of the present disclosure. Therefore, to the extent there are variations of the disclosure which are within the spirit of the present disclosure or equivalent to the present disclosure found in the claims, it is the intent that this patent will cover those variations as well.

What is claimed is:

1. A hybrid shelter comprising:
multiple rigid panel sections comprising a roof section, two side-wall sections, and two end-wall sections, each covered by a corresponding water-resistant panel sleeve section or by a water-resistant soft-shell;
a bed system; and
a case,
wherein the hybrid shelter is transitionable between an expanded configuration in which the side-wall sections and the end-wall sections are vertical and perpendicular to a floor of the case and a collapsed configuration in which the rigid panel sections are folded or hinged and fully enclosed in the case; and
wherein when the case is open, the bed system is configured to be rested on a center joint of the case and a feature of the side-wall panel sections.

2. The hybrid shelter of claim 1, wherein the feature on the side-wall panel sections comprises a hinge.

3. The hybrid shelter of claim 1, wherein the feature on the side-wall panel sections comprises a corner hinge.

4. The hybrid shelter of claim 1, wherein the bed system comprises a mattress platform.

5. The hybrid shelter of claim 1, wherein the bed system comprises a plurality of mattress platforms.

6. The hybrid shelter of claim 1, wherein the bed system is positioned above the floor of the case when the bed system is configured to be rested on the center joint.

7. The hybrid shelter of claim 1, wherein the bed system is positioned above the floor of the case when the bed system is configured to be rested on the feature.

8. The hybrid shelter of claim 1, wherein the case comprises a top section and a bottom section.

9. The hybrid shelter of claim 1, wherein the center joint is located between the top section and the bottom section.

10. The hybrid shelter of claim 1, wherein when the case is closed, the bed system is configured to be enclosed in the case.

11. A hybrid shelter comprising:
multiple rigid panel sections comprising a roof section, two side-wall sections, and two end-wall sections, each covered by a corresponding water-resistant panel sleeve section or by a water-resistant soft-shell; and
a case,
wherein the hybrid shelter is transitionable between an expanded configuration in which the side-wall sections and the end-wall sections are vertical and perpendicular to a floor of the case and a collapsed configuration in which the rigid panel sections, and along with either the sleeve section or the soft-shell, are folded or hinged and fully enclosed in the case.

12. The hybrid shelter of claim 11, wherein the rigid panel sections comprise composite material, metal, plastic, wood or a combination thereof.

13. The hybrid shelter of claim 11, wherein the soft-shell comprises canvas, fabric, plastic, nylon, vinyl, or a combination thereof.

14. The hybrid shelter of claim 11, wherein the rigid panel sections include a door and/or a window that aligns with a door and/or a window of the panel sleeve section or the soft-shell.

15. The hybrid shelter of claim 11 further comprising a bed system that includes a mattress platform and/or a mattress.

16. The hybrid shelter of claim 11, wherein the roof section, the two side-wall sections, and the two end-wall sections are bi-fold or hinged on one side, respectively.

17. The hybrid shelter of claim 11, wherein the case comprises a top section and a bottom section.

18. The hybrid shelter of claim 11, wherein the soft-shell comprises an elastic seam and an attachment that are configured to secure the soft-shell to the case.

19. The hybrid shelter of claim 11, wherein the side-wall sections and the end-wall sections are vertical and perpendicular to the roof section in the expanded configuration.

20. The hybrid shelter of claim 11, wherein the roof section comprising a first and a second roof sections forms a pitched roof, the first and the second roof sections being slanted relative to the side-wall sections.

* * * * *